(12) United States Patent
Xie et al.

(10) Patent No.: US 11,503,097 B2
(45) Date of Patent: *Nov. 15, 2022

(54) INTERACTIVE REAL-TIME VISUALIZATION SYSTEM FOR LARGE-SCALE STREAMING DATA

(71) Applicant: eBay Inc., San Jose, CA (US)

(72) Inventors: Jinrong Xie, San Jose, CA (US); Patrick Nelson, San Carlos, CA (US); Binbin Shao, San Jose, CA (US); Zeqian Shen, San Jose, CA (US); Zoher Karu, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,849

(22) Filed: Dec. 12, 2019

(65) Prior Publication Data
US 2020/0120151 A1 Apr. 16, 2020

Related U.S. Application Data

(63) Continuation of application No. 15/707,529, filed on Sep. 18, 2017, now Pat. No. 10,542,060.
(Continued)

(51) Int. Cl.
*H04L 65/75* (2022.01)
*G06F 16/26* (2019.01)
(Continued)

(52) U.S. Cl.
CPC ............ *H04L 65/762* (2022.05); *G06F 16/26* (2019.01); *G06F 16/904* (2019.01); *H04L 65/60* (2013.01); *H04L 65/61* (2022.05)

(58) Field of Classification Search
None
See application file for complete search history.

(56) References Cited

U.S. PATENT DOCUMENTS 5,751,931 A * 5/1998 Cox ...................... G06T 11/206
345/419
6,397,163 B1 * 5/2002 Hoyt ..................... G06Q 10/08
206/559
(Continued)

FOREIGN PATENT DOCUMENTS

JP 2014203304 A 10/2014
WO 2013/089539 A1 6/2013
WO 2018/053490 A1 3/2018

OTHER PUBLICATIONS

Office Action Received for Korean Patent Application No. 10-2019-7007978, dated Jun. 16, 2020, 24 pages (13 pages of Official Copy and 11 pages of English Translation).
(Continued)

*Primary Examiner* — Lance Leonard Barry
(74) *Attorney, Agent, or Firm* — FIG. 1 Patents

(57) ABSTRACT

Aspects of the present disclosure involve a system comprising a computer-readable storage medium storing at least one program, and a method for rendering interactive visualizations of high volume streaming data. Streaming data that describes a plurality of events is loaded in memory. The streaming data includes geospatial data that specifies a source location and a destination location for each event. Visual metaphors representing the events are rendered using a visualization mathematical model that defines, for each visual metaphor, a spatial position and opacity for each point along the visual metaphor throughout a sliding time window.

20 Claims, 17 Drawing Sheets

Related U.S. Application Data

(60) Provisional application No. 62/396,632, filed on Sep. 19, 2016.

(51) Int. Cl.
  *G06F 16/904* (2019.01)
  *H04L 65/60* (2022.01)
  *H04L 65/61* (2022.01)

(56) References Cited

U.S. PATENT DOCUMENTS

| | | | | |
|---|---|---|---|---|
| 7,885,733 | B1* | 2/2011 | Simon | G01C 23/005 |
| | | | | 701/4 |
| 7,945,658 | B1 | 5/2011 | Nucci et al. | |
| 8,095,427 | B1* | 1/2012 | Buxton | G06Q 30/0609 |
| | | | | 705/26.25 |
| 8,436,872 | B2 | 5/2013 | Wright et al. | |
| 8,768,804 | B2 | 7/2014 | Holten et al. | |
| 9,286,639 | B1* | 3/2016 | Patzer | G06Q 20/10 |
| 10,542,060 | B2* | 1/2020 | Xie | G06F 16/904 |
| 2003/0115340 | A1* | 6/2003 | Sagula | H04L 12/185 |
| | | | | 709/228 |
| 2003/0222904 | A1* | 12/2003 | Allor | G06F 9/451 |
| | | | | 715/744 |
| 2006/0129437 | A1* | 6/2006 | Lee | G06Q 10/02 |
| | | | | 705/5 |
| 2006/0170677 | A1* | 8/2006 | Zhao | G06T 13/20 |
| | | | | 345/423 |
| 2009/0070130 | A1* | 3/2009 | Sundaresan | G06Q 30/06 |
| | | | | 705/319 |
| 2010/0238176 | A1* | 9/2010 | Guo | G06T 13/80 |
| | | | | 345/440 |
| 2010/0257267 | A1* | 10/2010 | Sohn | H04L 63/1416 |
| | | | | 709/224 |
| 2011/0199286 | A1* | 8/2011 | Dziama | G09G 3/001 |
| | | | | 345/82 |
| 2012/0089920 | A1* | 4/2012 | Eick | G06T 11/206 |
| | | | | 715/739 |
| 2012/0137367 | A1* | 5/2012 | Dupont | G06F 21/00 |
| | | | | 726/25 |
| 2012/0246059 | A1* | 9/2012 | Mahoney | G06Q 40/06 |
| | | | | 705/37 |
| 2013/0063489 | A1 | 3/2013 | Hourie et al. | |
| 2013/0085018 | A1 | 4/2013 | Jensen et al. | |
| 2013/0307843 | A1* | 11/2013 | Sikka | G06F 16/26 |
| | | | | 345/419 |
| 2014/0033055 | A1 | 1/2014 | Gardner et al. | |
| 2014/0095543 | A1* | 4/2014 | Hsiao | G06F 16/245 |
| | | | | 707/779 |
| 2014/0132623 | A1* | 5/2014 | Holten | G06T 11/206 |
| | | | | 345/593 |
| 2014/0281017 | A1* | 9/2014 | Apte | H04L 47/2408 |
| | | | | 709/234 |
| 2015/0113018 | A1 | 4/2015 | Steed et al. | |
| 2015/0244763 | A1 | 8/2015 | Parikh et al. | |
| 2015/0338233 | A1 | 11/2015 | Cervelli et al. | |
| 2016/0260183 | A1* | 9/2016 | Kim | G06Q 10/025 |
| 2016/0308739 | A1* | 10/2016 | Benjamin | H04L 43/12 |
| 2017/0083585 | A1* | 3/2017 | Chen | G06F 11/3006 |
| 2017/0221067 | A1* | 8/2017 | Barquero Garro | G06Q 20/382 |
| 2017/0351753 | A1* | 12/2017 | Duncker | G06F 16/338 |
| 2018/0084024 | A1 | 3/2018 | Xie et al. | |

OTHER PUBLICATIONS

Response to Office Action Filed on Aug. 14, 2020, for Korean Patent Application No. 10-2019-7007978, dated Jun. 16, 2020, 22 Pages (17 pages of official copy & 5 pages of English translation of claims).
Office Action received for Japanese Patent Application No. 2019-514311, dated Jun. 2, 2020, 6 pages (3 Pages of Official Copy and 3 pages of English Translation).
Response to Office Action filed on Jul. 27, 2020, for Japanese Patent Application No. 2019-514311, dated Jun. 2, 2020, 14 Pages (8 pages of Official Copy & 6 Pages of English translation Claims Copy).
Amendment filed on Mar. 19, 2019, for Korean Patent Application No. 10-2019-7007978, 5 pages (3 pages of Original Document and 2 pages of English Translation).
Applicant Initiated Interview Summary received for U.S. Appl. No. 15/707,529, dated Jun. 3, 2019, 3 pages.
Non-Final Office action received for U.S. Appl. No. 15/707,529, dated Apr. 4, 2019, 20 pages.
Notice of Allowance received for U.S. Appl. No. 15/707,529, dated Sep. 11, 2019, 6 pages.
Response to Non-Final Office Action filed on Jun. 26, 2019 for U.S. Appl. No. 15/707,529, dated Apr. 4, 2019, 33 pages.
Supplemental Notice of Allowability Received for U.S. Appl. No. 15/707,529, dated Oct. 10, 2019, 3 pages.
Extended European Search Report received for European Patent Application No. 17851774.4, dated Jul. 4, 2019, 10 pages.
Response to Extended European Search Report filed on Dec. 31, 2019, for European Patent Application No. 17851774.4, dated Jul. 4, 2019, 16 pages.
Voluntary Amendment filed on Apr. 3, 2019, for Japanese Patent Application No. 2019-514311, 10 pages (6 pages of Original document and 4 pages of English Translation).
International Preliminary Report on Patentability received for PCT Application No. PCT/US2017/052227, dated Mar. 28, 2019, 10 pages.
International Search Report received for PCT Application No. PCT/US2017/052227, dated Dec. 1, 2017, 2 pages.
Written Opinion received for PCT Patent Application No. PCT/US2017/052227, dated Dec. 1, 2017, 6 pages.
Summers, "This virtual globe shows (almost) every Bitcoin transaction and freshly minted block in real-time", Retrieved from the Internet URL: <https://thenextweb.com/insider/2014/02/04/virtual-globe-shows-almost-every-bitcoin-transaction-freshly-minted-block-real-time/>, Feb. 4, 2014, 20 pages.
Wikipedia, "Document Object Model," Retrieved from the Internet URL: https://en.wikipedia.org/wiki/Document_Object_Model, Accessed on Jan. 22, 2020, 4 pages.
Wikipedia, "Scalable Vector Graphics," Retrieved from the Internet URL: https://en.wikipedia.org/wiki/Scalable_Vector_Graphics, Accessed on Jan. 22, 2020, 12 pages.
Wikipedia, "D3.JS," Retrieved from the Internet URL: https://en.wikipedia.org/wiki/D3.js, Accessed on Jan. 22, 2020, 6 pages.
Wikipedia, "Motion Perception," Retrieved from the Internet URL: https://en.wikipedia.org/wiki/Motion_perception, Accessed on Jan. 22, 2020, 12 pages.
Wikipedia, "Gaussian Function," Retrieved from the Internet URL: https://en.wikipedia.org/wiki/Gaussian_function, Accessed on Jan. 22, 2020, 10 pages.
Wikipedia, "WebGL," Retrieved from the Internet URL: https://en.wikipedia.org/wiki/WebGL, Accessed on Jan. 22, 2020, 8 pages.
Wikipedia, "Jitter," Retrieved from the Internet URL: https://en.wikipedia.org/wiki/Jitter, Accessed on Jan. 22, 2020, 7 pages.
Wikipedia, "Level of Detail," Retrieved from the Internet URL: https://en.wikipedia.org/wiki/Level_of_detail, Accessed on Jan. 22, 2020, 6 pages.
Wills, et al., "Linked Data Views," Handbook of Data Visualization, Jan. 2008, 6 pages.
Office Action received for Japanese Patent Application No. 2019-514311, dated Nov. 4, 2020, 4 pages (2 pages of Official Copy and 2 pages of English Translation).
GitHub, "fiorix/freegeoip", IP geolocation web server, Retrieved from internet URL: https://github.com/fiorix/freegeoip, Apr. 3, 2018, 7 Pages.
Result Of Consultation Received for European Patent Application No. 17851774.4, dated Aug. 4, 2021, 5 Pages.
Wikipedia,"Block chain", Retrieved from internet URL: https://en.bitcoin.it/wiki/Block_chain, Accessed on Sep. 10, 2021, 2 Pages.
Realtime Bitcoin Globe, Cmd Amsterdam, Retrieved from Internet URL: https://www.cmd-amsterdam.nl/portfolio/realtime-bitcoin-globe/, Accessed on Sep. 10, 2021, 4 Pages.

(56) References Cited

OTHER PUBLICATIONS

Office Action received for Korean Patent Application No. 10-2021-7007970, dated May 17, 2021, 10 Pages (5 pages of Official Copy & 5 pages of English Translation).
Final Office Action received for Korean Patent Application No. 10-2021-7007970, dated Nov. 6, 2021, 5 pages (1 page of English translation and 4 page of official copy).

* cited by examiner

INTERACTIVE REAL-TIME VISUALIZATION SYSTEM FOR LARGE-SCALE STREAMING DATA

PRIORITY CLAIM

This application is a continuation of and claims priority to U.S. patent Ser. No. 10,542,060, filed Sep. 18, 2017, which claims priority to U.S. Provisional Application Ser. No. 62/396,632, filed on Sep. 19, 2016, the disclosures of which are incorporated by reference herein.

TECHNICAL FIELD

The present disclosure generally relates to machines configured to the technical field of special-purpose machines that generate and render visualizations including computerized variants of such special-purpose machines and improvements to such variants, and to the technologies by which such special-purpose machines become improved compared to other special-purpose machines that generate and render visualizations. In particular, the present disclosure addresses interactive real-time visualization systems and methods for large-scale streaming data.

BACKGROUND

Currently it is very costly in terms of computational resources to analyze a high-volume live data stream and visualize it at an interactive rate on end user devices. This is especially true in the era of big data, as many of the decisions being made rely on efficient analysis and visualization of complex data. Indeed, it is nontrivial to process and visualize data both in real-time and in large scale.

Conventional preload-store-plot approaches to visualizing high volumes of data suffer a great amount of data I/O lag and, at their best, these approaches merely provide near real-time performance. Furthermore, front-end approaches to visualizations can be easily overwhelmed when the amount of data points grows too large. For example, many of today's visualization libraries (e.g., D3.js) are easy to program and rich in expressiveness; however, they cannot scale to tens of thousands of elements (and beyond). Solutions such as Level-Of-Detail scaling have been around for some time, but this barely mitigates performance issues encountered when users have the ability to display multiple linked views.

BRIEF DESCRIPTION OF THE DRAWINGS

Various ones of the appended drawings merely illustrate example embodiments of the present disclosure and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve a visualization system that allows users to interactively assess geo-tagged event data (e.g., transaction data) in multi-dimensional space, to understand a spatial and temporal distribution of event data, and to understand behavior at various scale levels (e.g., regional, national, or global). Such a visualization system may find particular application in aiding the generation of stories for public relations, branding, and corporate communications regarding large-scale streaming data such as for use in social networking posts.

As an example, to provide greater insights, the visualization system may be configured to provide multiple linked views for display in a multi-screen display system. For example, the multi-screen display system may be configured such that a large center screen may be configured to display an overview of a rotating three-dimensional (3D) virtual globe, and side screens may be configured to display zoom-in views of different regions of the globe, along with a planar world map. As an alternative example, the visualization system may be integrated with a virtual reality (VR) system such as a VR headset that allows users to view and interact with visualizations in VR space. In addition to the multi-screen display and VR systems, the visualization system may be integrated with a motion input device, which allows users to directly navigate the 3D virtual globe or 3D planar world map with their hand gestures.

Figure 1:
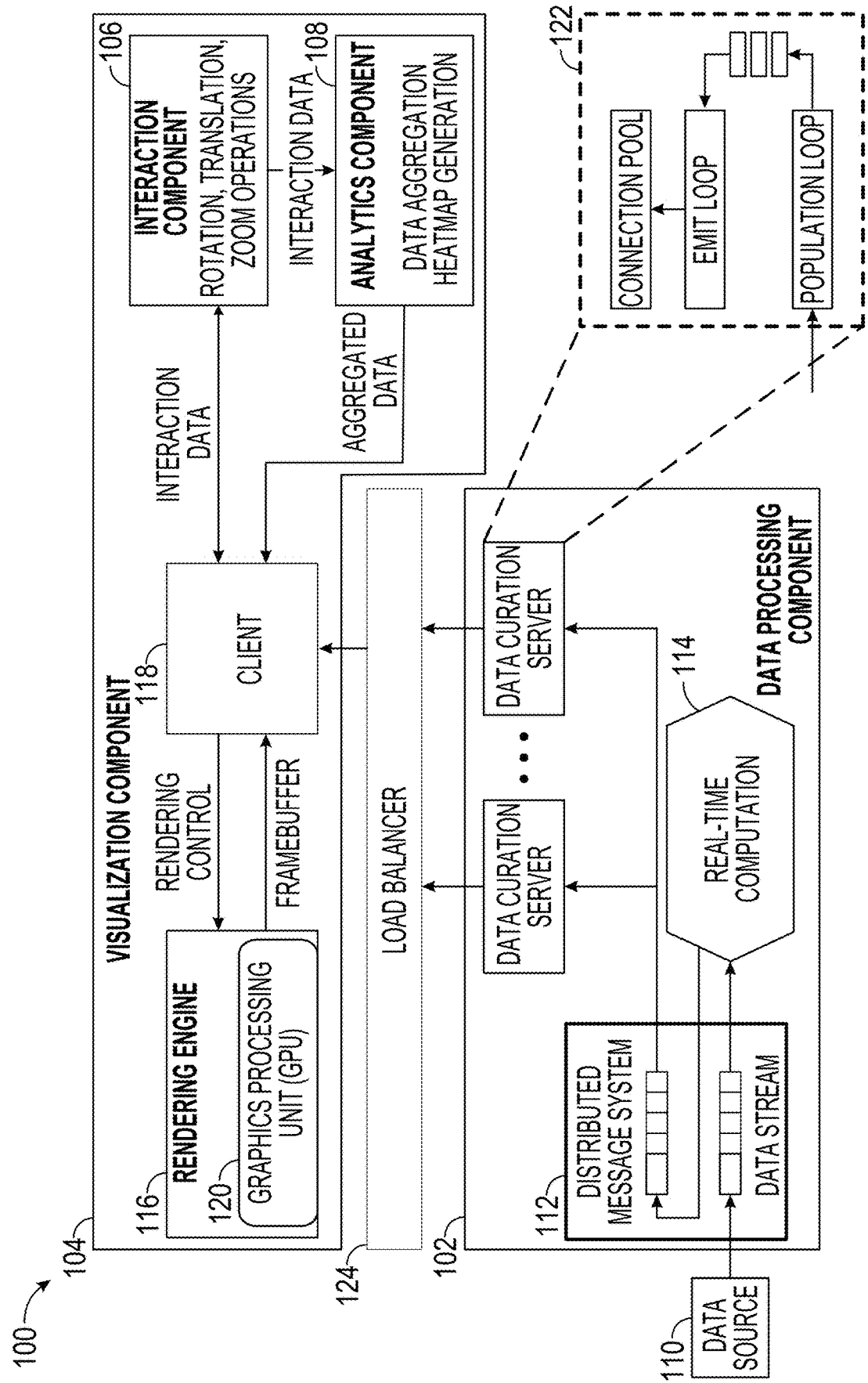
FIG. 1 is a system diagram depicting a visualization system, according to example embodiments.

With reference to FIG. 1, a visualization system 100 is illustrated, according to example embodiments. As shown, the visualization system 100 comprises a back-end data processing component 102, a front-end visualization component 104, an interaction component 106, and an analytics component 108. As is understood by skilled artisans in the relevant computer arts, these functional components illustrated in FIG. 1 represent a set of executable software instructions and the corresponding hardware (e.g., memory and processor) for executing the instructions. Furthermore, the various functional components depicted in FIG. 1 may reside on a single machine (e.g., a server or a laptop), or may be distributed across several computers in various arrangements, such as cloud-based architectures. Moreover, it shall be appreciated that while the functional components of FIG. 1 are discussed in the singular sense, in other embodiments, multiple instances of one or more of the components may be employed.

The back-end data processing component 102 is responsible for processing live streaming data from an incoming data source 110. The back-end data processing component 102 processes the live streaming data as it is generated. The front-end visualization component 104 displays a subset of the data from the back-end data processing component 102 based on, for example, user specified constraints. The interaction component 106 processes user interaction with the front-end visualization component 104. The analytics component 108 determines a user's selection and filter, and then applies corresponding rules to control output from the front-end visualization component 104. As an example of the filtering, the analytics component 108 may provide users the ability to filter information based on a category such that only transactions of a certain category (e.g., a category of products) may be visualized.

To effectively handle high-volume live data streams, the visualization system 100 employs a distributed messaging system 112 as a data store and utilizes a distributed real-time computation component 114 to reliably process unbounded streams of data. Moreover, in order to scale up the capability of the front-end visualization component 104 to plot massive amounts of information, the front-end visualization component 104 includes a rendering engine 116 that renders visualizations on a display device of a client 118. The client 118 for which visualizations are rendered may, for example, correspond to a computing machine (e.g., personal computer or laptop) executing a web browser, a mobile device (e.g., a smartphone) executing an application configured to communicate with the visualization system 100, a VR headset display, or any combination thereof.

The rendering engine 116 employs a flexible temporal and geospatial visualization framework to improve and enhance visualization capability by leveraging computational resources of a local Graphics Processing Unit (GPU) 120 (e.g., the GPU of the client 118). In this manner, the rendering engine 116 can plot data in orders of magnitude faster than typical approaches such as those based on native Document Object Model (DOM) rendering.

The visualization system 100 includes an event-driven, non-blocking I/O runtime model that includes one or more data curations servers 122 to serve between the front-end visualization component 104 and the real-time computation component 114 to provide curated data to the front-end visualization component 104 and provide an extra layer of protection for the back-end data processing component 102. A load balancer 124 distributes connections between the one or more data curation servers 122 and a plurality of visualizations components including the visualization component 104.

Rendering Engine

As noted above, the rendering engine 116 utilizes the local GPU 120 to accelerate rendering speed to easily plot a large volume (e.g., millions) of geometric primitives (e.g., at 60 frames per second). Conventional methods that use DOM and Scalable Vector Graphics (SVG)-based techniques first generate intermediate HTML before rendering on a display. Such approaches do not scale well with a high volume of geometric primitives, like points or lines, and can expand the size of the HTML file, causing a significant performance drop on the client browser. In contrast, the rendering engine 116 uses a low level API (e.g., exposed by WebGL) with little overhead, and the rendering results are directly drawn on a canvas element, without creating intermediate SVG elements.

Figure 2:
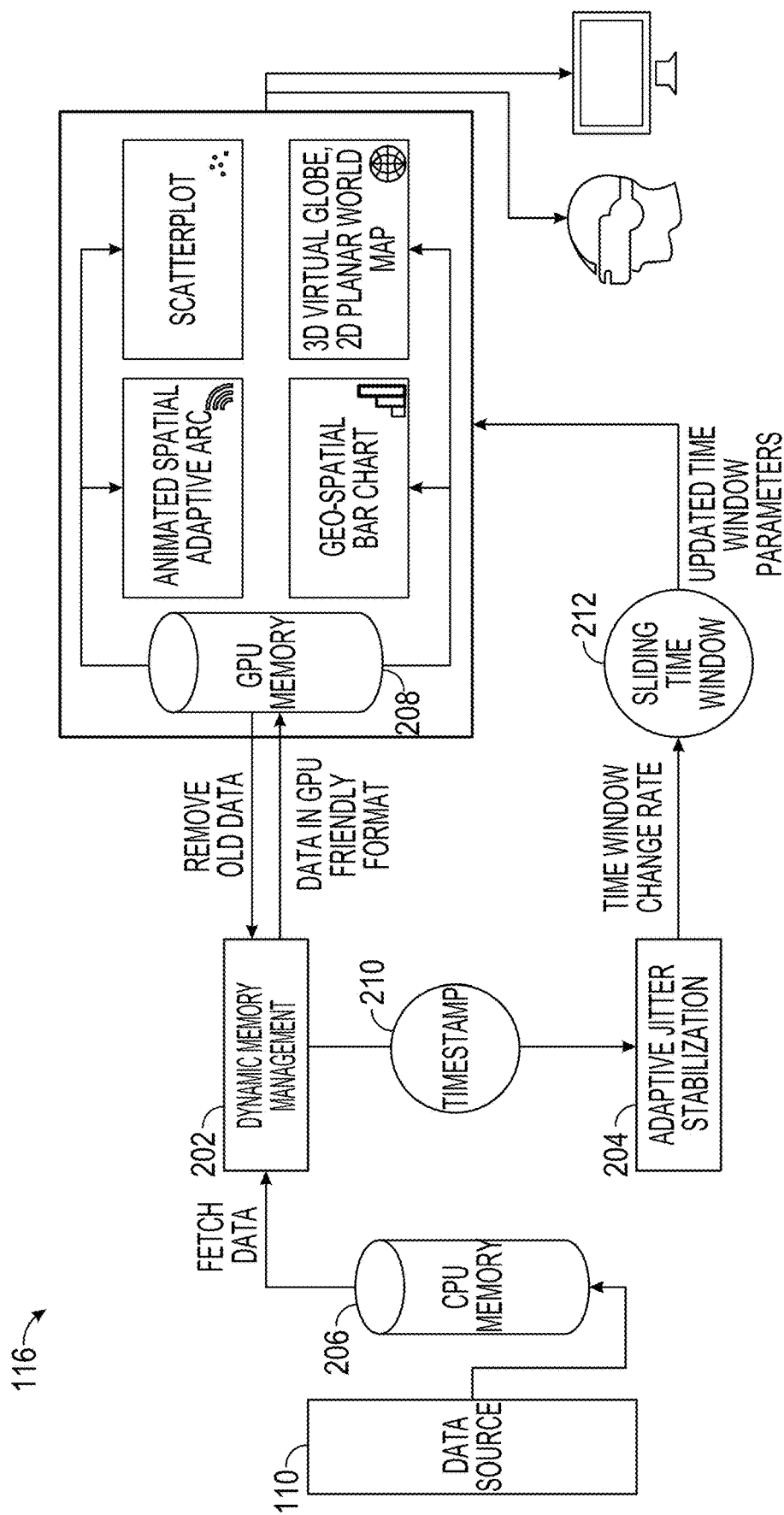
FIG. 2 is a block diagram illustrating functional components of a rendering engine, which is provided as part of the visualization system, according to example embodiments.

With reference to FIG. 2, functional components of the rendering engine 116 are shown, according to example embodiments. The functional components of the rendering engine 116 illustrated in FIG. 2 may represent hardware, software, or various combinations of both (e.g., memory and processor).

The rendering engine 116 is capable of visualizing dynamic, large-scale, real-time streaming events in various visual metaphors. Such visual metaphors include spatial adaptive arc animation, scatterplots, and geo-based bar charts, either on 3D virtual globe or on two-dimensional (2D) planar map. The rendering engine 116 provides a smooth transition between 3D spherical projection and 2D planar projection, thereby providing a user with maximum flexibility to visualize real-time streaming events with geo-location dimensions. As noted above, the rendering engine 116 may render such visual metaphors on a display of a client device such as a computing machine (e.g., personal computer or laptop) executing a web browser, a mobile device (e.g., a smartphone) executing an application configured to communicate with the visualization system 100, a VR headset display, or any combination thereof.

As shown in FIG. 2, the rendering engine 116 includes a dynamic memory management component 202 and an adaptive jitter stabilization component 204. The dynamic memory management component 202 is configured to handle swapping in/out new/old data so as to keep the total data volume at a manageable size without sacrificing the rendering quality. As shown, live streaming data obtained by the back-end data processing component 102 from the data source 110 is loaded into a central processing unit (CPU) memory 206 (e.g., a CPU cache) where it is fetched by the dynamic memory management component 202 and loaded into a GPU memory 208 (e.g., a GPU cache). As will be discussed in further detail below, the dynamic memory management component 202 uses a mathematical model to decide when to swap out old data from the GPU memory 208 to achieve a seamless transition across multiple batches of streaming data, where each batch of streaming data may include multiple data packets. In addition, the dynamic memory management component 202 provides the adaptive jitter stabilization component 204 with a timestamp 210 of a most recent arriving data packet.

With reference to the adaptive jitter stabilization component 204, jitter includes an undesired deviation from true periodicity of an assumed periodic signal. Jitter is very common in live streaming data due to the network traffic fluctuation, packet lose and resend, or backend data compute resource variation. Overall, jitter breaks the regular flow pattern of real-time streaming data, causing an irregular delay of real-time packet arrival, or even worse, out-of-order arrival (e.g., old packet arrives later than new packet does). Without jitter, the timestamp 210 in the most recent data packet may be used to control progress of animation. However, due to the presence of jitter, directly using the timestamp 210 of the original jittered streaming data in the visualization may cause confusion for the user. This is especially true with animated spatial adaptive arc visualizations. For example, in the worst case, the animated arc flies back and forth like a boomerang.

To compensate for the forgoing issue, the adaptive jitter stabilization component 204 computes the delta between the timestamp 210 of the most recent data packet and an animation sliding time window 212 to decide a rate of change for updating the sliding time window 212. The sliding time window 212 includes an upper bound and a lower bound. For purposes of explanation, let $T_p(t)$ be an epoch timestamp of an incoming data packet at time t. Further, let $T_w(t)=(T_{min}(t), T_{max}(t))$ denote a sliding time window that controls the animation progress, where $T_{min}(t)$ is the lower bound, $T_{max}(t)$ is the upper bound, and $|T_{min}(t)-T_{max}(t)|$ is constant. The rate of change of $T_w(t)$ in the current key frame is governed by the following first-order ordinary differential formula (hereinafter referred to as "Formula 1"):

$$\begin{cases} \frac{dT_{max}}{dt} = \omega * h * \max((T_p(t) - T_{max(t)}), 0) \\ T_{max}(t_0) = T_p(t_0) \end{cases}$$

where $\omega$ is a small constant coefficient, and h is a step size that is usually a small fraction of $|T_{min}(t)-T_{max}(t)|$. Formula 1 can be solved by the Euler stepping scheme, for example. In the context of Formula 1, the rate of change of the sliding window depends on a difference between the most recent data timestamp and an upper bound of the sliding time window. If the data timestamp is older than the upper bound of the sliding time window ($T_p(t)<T_{max}(t)$), Formula 1 causes the time window to stop moving forward. This is a jitter situation in which an old data packet is arriving later than it should have. On the other hand, if the sliding time window is moving too slow and the most recent timestamp is newer than the upper bound of the sliding time window ($T_p(t)>T_{max}(t)$), the rate of change of the time window is retained or increased. In summary, in either case, Formula 1 will balance $T_p(t)$ and $T_{max}(t)$, so that they are in sync.

Visualization Mathematical Model

The rendering engine 116 utilizes a mathematical model to shape a visual metaphor, such as an animated spatial adaptive arc, representing each occurrence of a real-time streaming event. Such an event normally features high dimensionality with at least geospatial and temporal information. The rendering engine 116 provides a smooth transition through multiple discrete bulk of events, which may, for example, help a human analyst achieve a better mental model of the evolving data.

In some embodiments, the rendering engine 116 uses a flexible animated spatial adaptive arc plotted around a virtual 3D globe or on a 2D planar world map to represent each real-time event. For example, the real-time event may correspond to a transaction between a buyer and a seller, and the rendering engine 116 may clearly delineate a curved arc connecting the location of the seller to the location of the buyer as the transaction happens in real-time. A breakdown of elements of the visualization mathematical model employed by the rendering engine 116 is presented below.

Generating an Arc Between Two Endpoints on a Spherical Surface.

Figure 3:
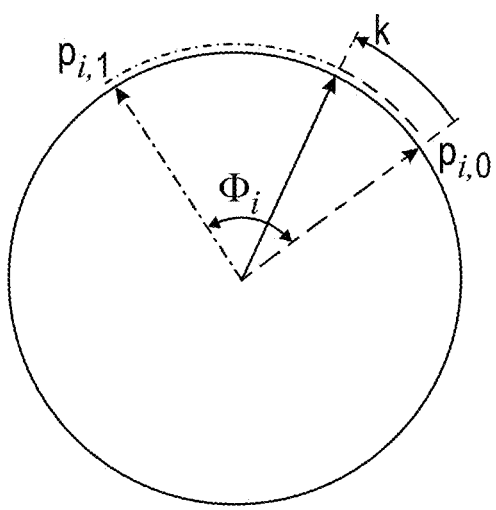
FIG. 3 is a diagram illustrating interpolation of a point on an arc, according to example embodiments.

With reference to FIG. 3, let $p_{i,0}$ and $p_{i,1}$ be the first and last points of the ith arc, and let the k be the parameter, $0 \leq k \leq 1$. The geometric formula that defines any point on the arc is then given by the following (hereinafter referred to as "Formula 2"):

$$P(p_{i,0}, p_{i,1}; k) = \frac{\sin((1-k)\Phi_i)}{\sin \Phi_i} p_{i,0} + \frac{\sin(k\Phi_i)}{\sin \Phi_i} p_{i,1}$$

Where $\phi_i$ is computed as the angle subtended by the ith arc, as shown in FIG. 3. Such a model smoothly interpolates points on a circular arc between two end points.

Introducing Adaptive Curvature Control to Arc.

To further extend Formula 2 described above, an adaptive curvature control may be incorporated such that a pair of points closer to each other on the surface of a sphere will generate an arc that looks more flat than arcs connecting a pair of points that are further away. There are several benefits of incorporating the adaptive curvature control when the number of curves is huge, including, for example: 1) providing more visual variance of the arcs; 2) reducing visual clutter, since a longer arc tends to have higher altitude than the shorter one in this model, thus separating itself from the shorter one; 3) making the arcs naturally clustered by the distance between their end points, forming a set of salient visual patterns; and 4) alleviating longer arcs being occluded by the virtual 3D globe.

Figure 4:
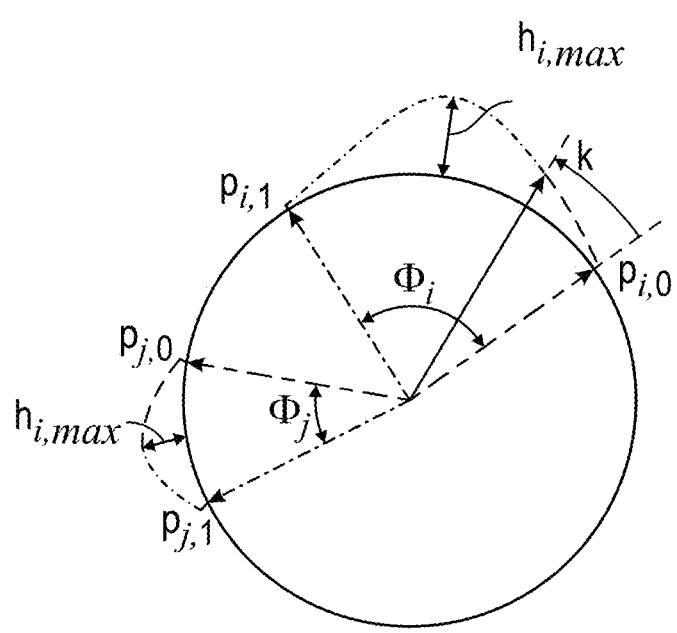
FIG. 4 is a diagram illustrating interpolation of an ith point on an arc, according to example embodiments.

The geometric formula that defines any point on the new arc is then given by the following (hereinafter "Formula 3"):

$$P(p_{i,0},p_{i,1},h_{i,max};k)=P(p_{i,0},p_{i,1};k)*(1+h_{i,max}(1-4(k-0.5)^2))$$

where the maximum height $h_{i,\,max}$ determines the arc curvature, and is defined as $h_{i,max}=\lambda\Phi_i$, where $0 \leq \lambda \leq 1$ is a user selected global constant coefficient that applies to all the arcs. Particularly, $\lambda=0$, Formula 3 degenerates to Formula 2. As an example, the results of the application of Formula 3 are illustrated in FIG. 4.

Introducing animation to an arc.

Based on the last two models, it is difficult to identify a starting point (source) and an end point (destination). To address this problem, animation is introduced into the arc by showing a flying highlight from the source point to the destination point. The flying highlight is a small section of the arc with high opacity while the opacity in the rest of an arc has been damped out. By changing which section has higher opacity, the rendering engine 116 can generate animation giving a viewer a mental impression of a flying arc. While it is possible to use other visual metaphors to represent source and destination points, such as different colors, shapes, or labels, the benefits of using an arc are: 1) a viewer can immediately capture the idea of source and destination points without visually comparing the difference between two end points (this is especially true when one or two end points are on the other side of the virtual globe); and 2) it delivers more attractiveness and engagement as human eyes are more sensitive to a moving object.

The opacity distribution along the ith arc in this model is formulated by a Gaussian function (hereinafter "Formula 4") whose peak position is controlled by the sliding time window discussed above:

$$\begin{cases} OP^i_{spatial}(k, \tau) = \begin{cases} \alpha e^{-\frac{(k-t)^2}{\beta}}, & \text{otherwise} \\ 0, & k > c + \tau \end{cases} \\ \text{and } \tau = (T_{max} - t_i)/(T_{max} - T_{min}) \end{cases}$$

Where parameter $t_i$ is the epoch timestamp of the ith event. $\alpha$ and $\beta$ are tunable constant coefficients. k is the same parameter as in Formula 3. $\tau$ is a new parameter, $0 \leq \tau \leq 1$, to control the highlight position on the arc relative to the starting point $p_{i,0}$. For example, when $\tau=0$, OP(k, 0) achieves maximum at t=0, which corresponds to $p_{i,0}$. Similarly, when $\tau=1$, OP(k, 1) achieves maximum at k=1, which is at $p_{i,1}$. As a result, as τ goes from 0 to 1, the highlight portion moves from a starting point (e.g., the source location) to an end point (e.g., the destination location). The constant coefficient c is a small threshold such that the opacity will simply drop to zero for the portion of the arc whose k>c+τ.

Figure 5A:
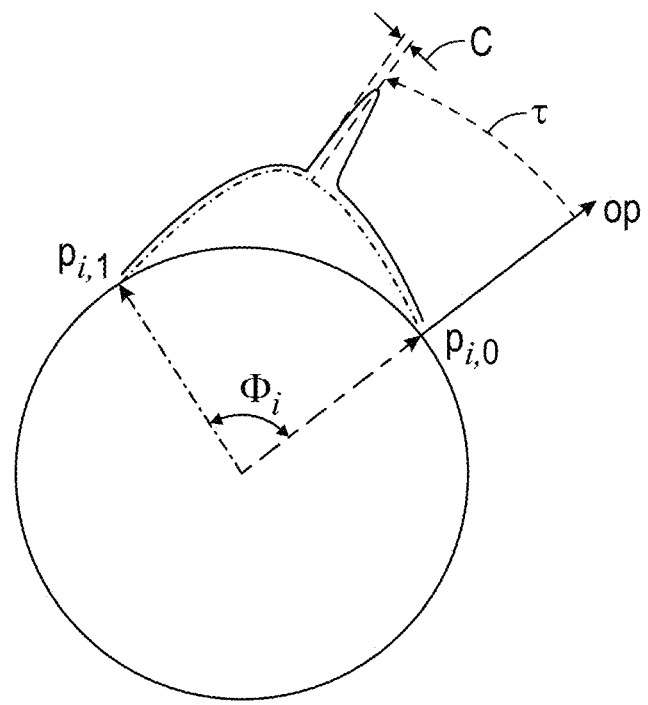
FIGS. 5A and 5B are diagrams illustrating a parameterizing arch highlight animation along a curve, according to example embodiments.
Figure 5B:
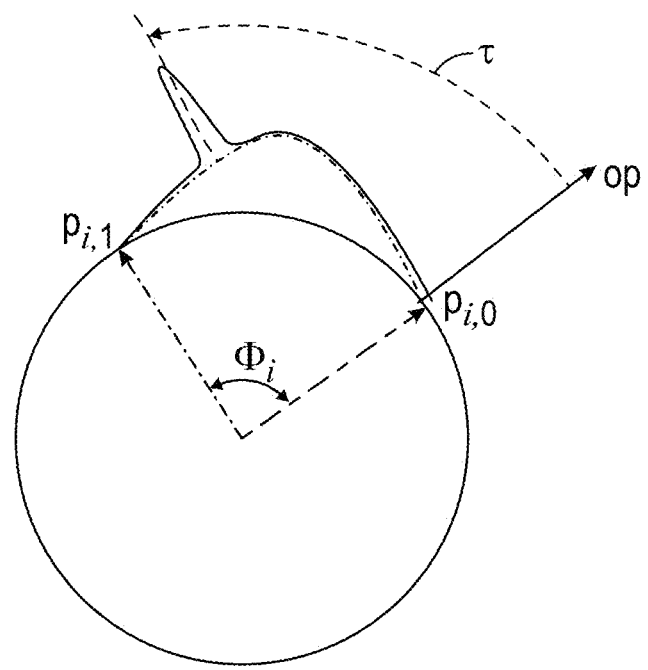

FIGS. 5A and 5B provide an illustrative example of the application of Formula 4. With reference to FIG. 5A, the dashed arrow points to the highlight moving direction as τ increases from 0 to 1. The pulse function below the dashed arrow is the opacity distribution, defined by Formula 4, along the arc. With reference to FIG. 5B, a similar example to FIG. 5A is illustrated, but with τ increased to a higher value causing the highlight moving closer to the destination point pi,1.

Incorporating Arc Retention.

The rendering engine 116 is configured to avoid keeping old arcs (representing old events) on the display indefinitely, which would cause severe visual clutter. Further, the dynamic memory management component 202 is responsible for clearing both CPU and GPU memory for new data. To these ends, Formula 4 may be further improved with a data retention scheme that causes old data to be purged from memory. However, directly dumping the old data may cause unpleasant visual artifacts such as abrupt disappearance of a set of arcs from the display. To address the issue, the rendering engine 116 employs a temporal damping factor to gradually decrease the opacity of each arc based on its age as determined from the timestamp associated with the corresponding event. Once an arc is fully transparent, its corresponding data will then be purged from memory. The following formula (hereinafter referred to as "Formula 5") is used to smoothly control the fade-out effect analytically:

$$\begin{cases} OP^i_{temporal}(t_i; \mu) = \gamma e^{-\frac{(t_i-\mu)^2}{2\sigma^2}} \\ \mu = \frac{T_{min} + T_{max}}{2} \end{cases}$$

In Formula 5, the same sliding time window as in Formula 4 is applied. Parameter $t_i$ is the epoch timestamp of the ith event. γ and σ are tunable constant coefficients that determine the rate of decay, or in other words, how long we want to keep an arc alive.

Spatial and Temporal Opacity Control.

Finally, in order to establish a unified model to control both flying arc animation and fade-out effect, Formula 4 and Formula 5 may be fused and incorporated into the following formula (hereinafter "Formula 6"):

$$\begin{cases} OP(T_{min}, T_{max}, t_i, k; \tau, \mu) = OP^i_{spatial}(k; \tau) + OP^i_{temporal}(t_i; \mu) \\ \tau = (T_{max} - t_i)/(T_{max} - T_{min}) \end{cases}$$

Overall, Formula 6 and Formula 3 collectively define a time varying and spatial adaptive arc used as a visual metaphor to represent the ith real-time event that occurred at time $t_i$. For any point, parameterized by k, along this arc, its spatial position is given by Formula 3, and its opacity is computed by Formula 5. The variables that drive the entire animation and fade-out effect through time is the sliding time window $(T_{min}(t), T_{max}(t))$.

Parameter Optimization.

In some cases, the temporal opacity of visual metaphors may decay too quickly to give enough time for the animated highlight to fly from the source point $p_{i,0}$ to the destination point $p_{i,1}$. To make sure that each arc stays for a while after the animated highlight reaches the destination point, the following formula may be utilized to avoid an arc being faded out early:

$$\frac{T_{min} + T_{max}}{2} \leq \sigma$$

As shown, parameter σ, as in Formula 5, should be equal to or larger than half the size of the sliding window in order to make the Gaussian function in Formula 5 flat enough to keep an arc visible for a long period before its highlight reaches the destination point.

Figure 15:
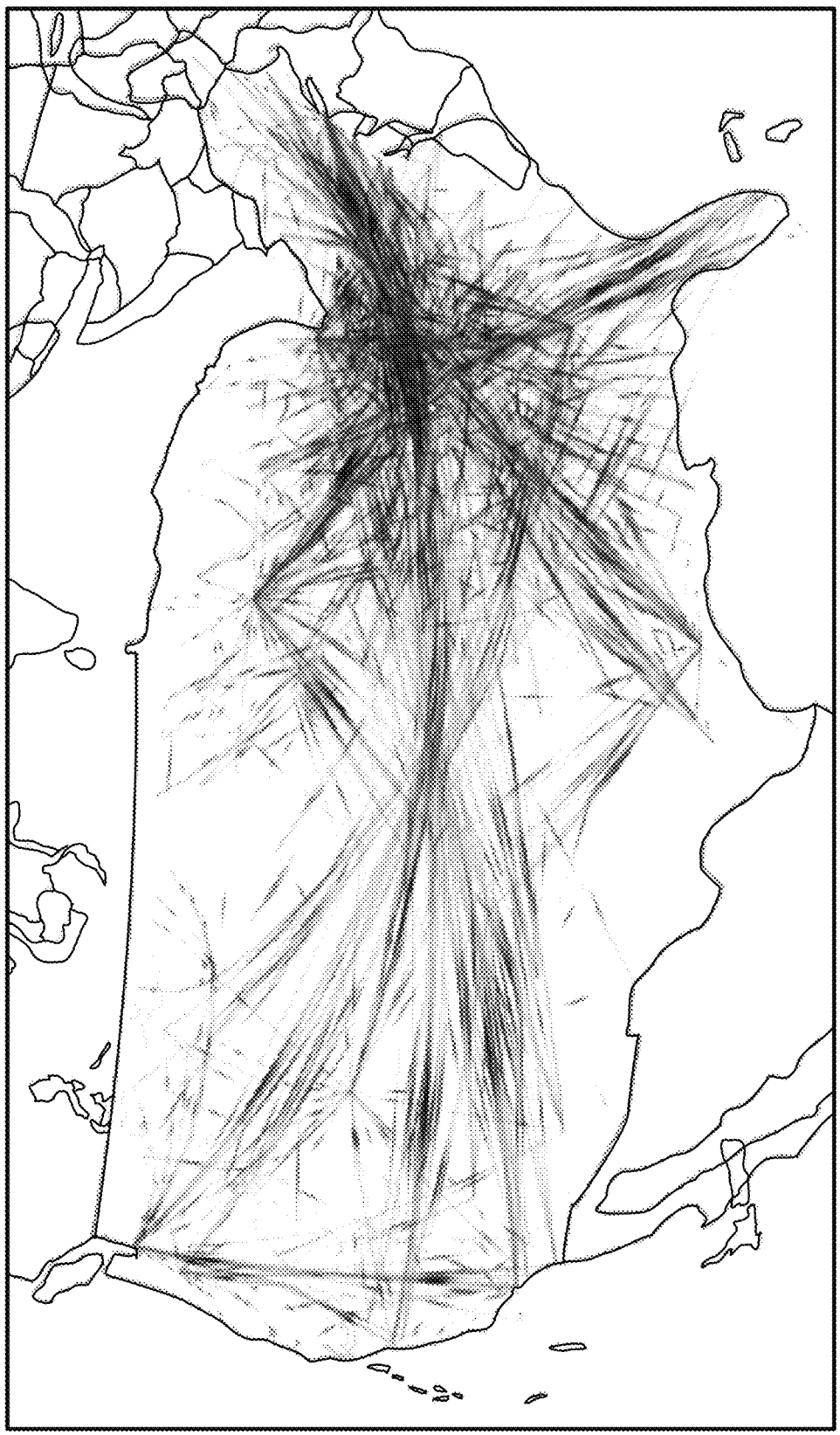

Additionally, in some embodiments, the arc modeling techniques employed by the visualization system 100 may be enhanced with an edge-bundling technique such as Force-Directed Edge Bundling and/or bundling by kernel density estimation. Techniques of this kind may further remedy visual clutter issues and potentially reveal high-level edge or arc patterns. An example of this technique is illustrated in FIG. 15.

Through utilization of the mathematical model describe above, the rendering engine 116 can handle smooth transition and efficient rendering of live real-time event data in addition to replaying historical data. This may prove to be especially useful for an analyst looking to view historical data in a fast-forward fashion, playing back one day or one week of data in a matter of minutes.

Figure 6:
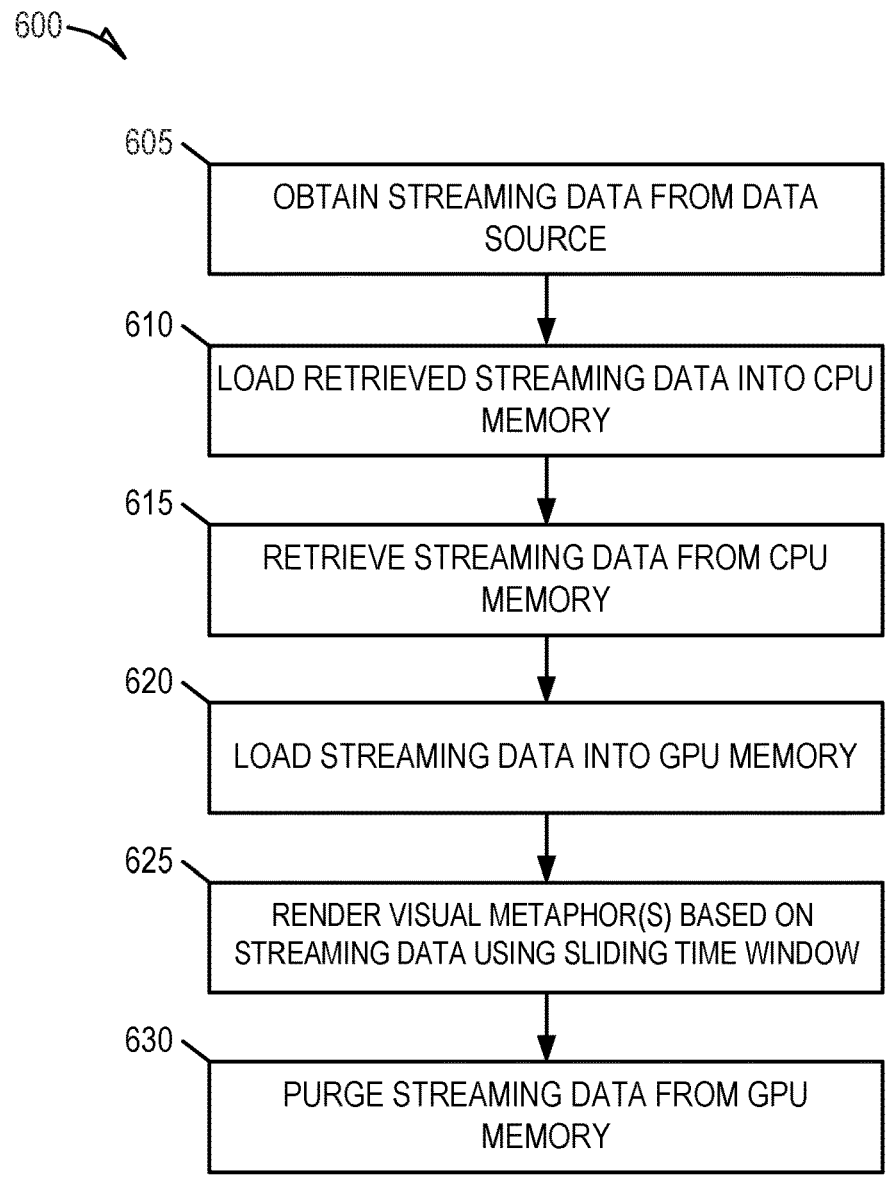
FIGS. 6-8 are flowcharts illustrating example operations of the visualization system in performing a method for rendering visual metaphors, according to example embodiments.
Figure 7:
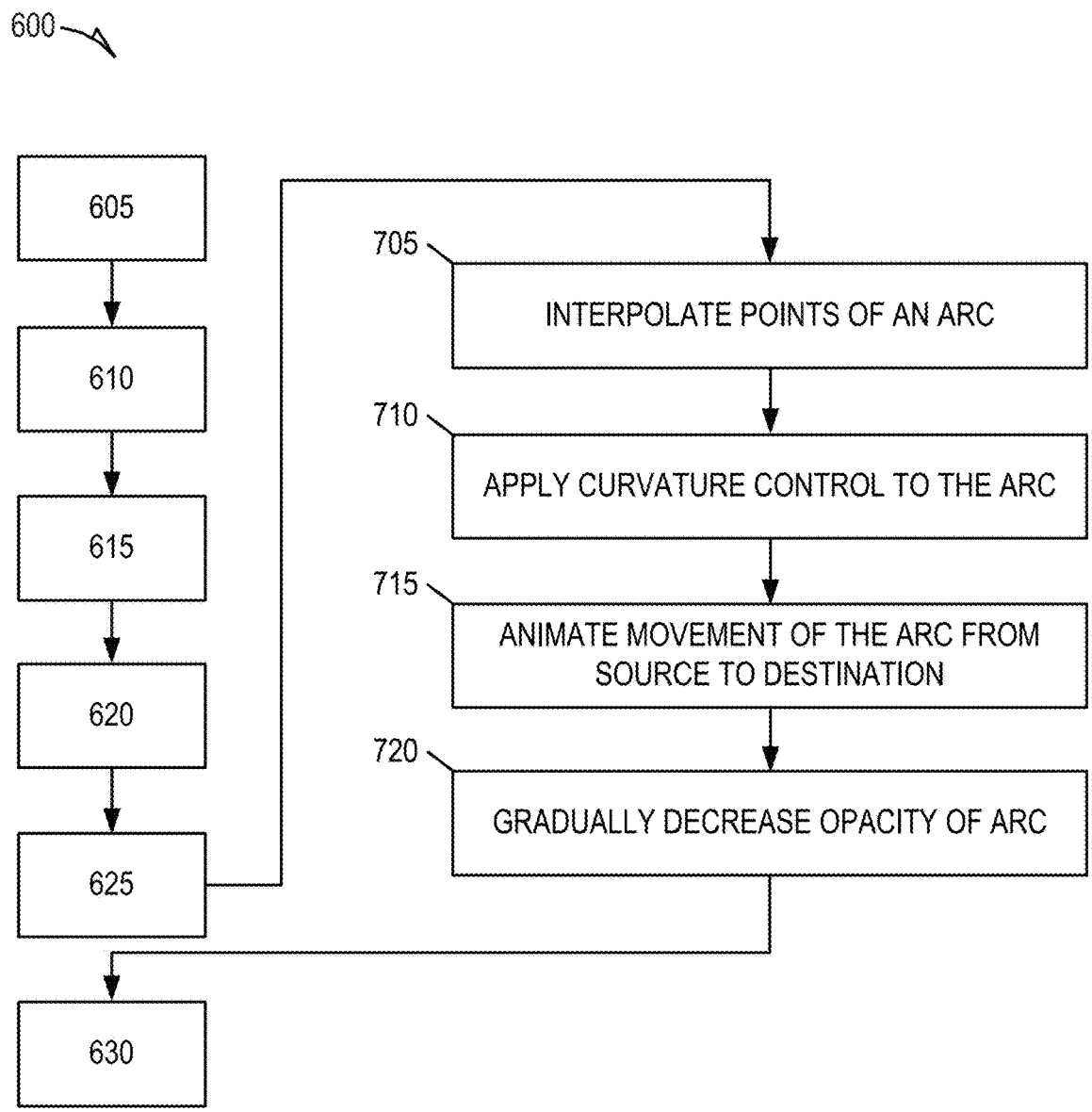
Figure 8:
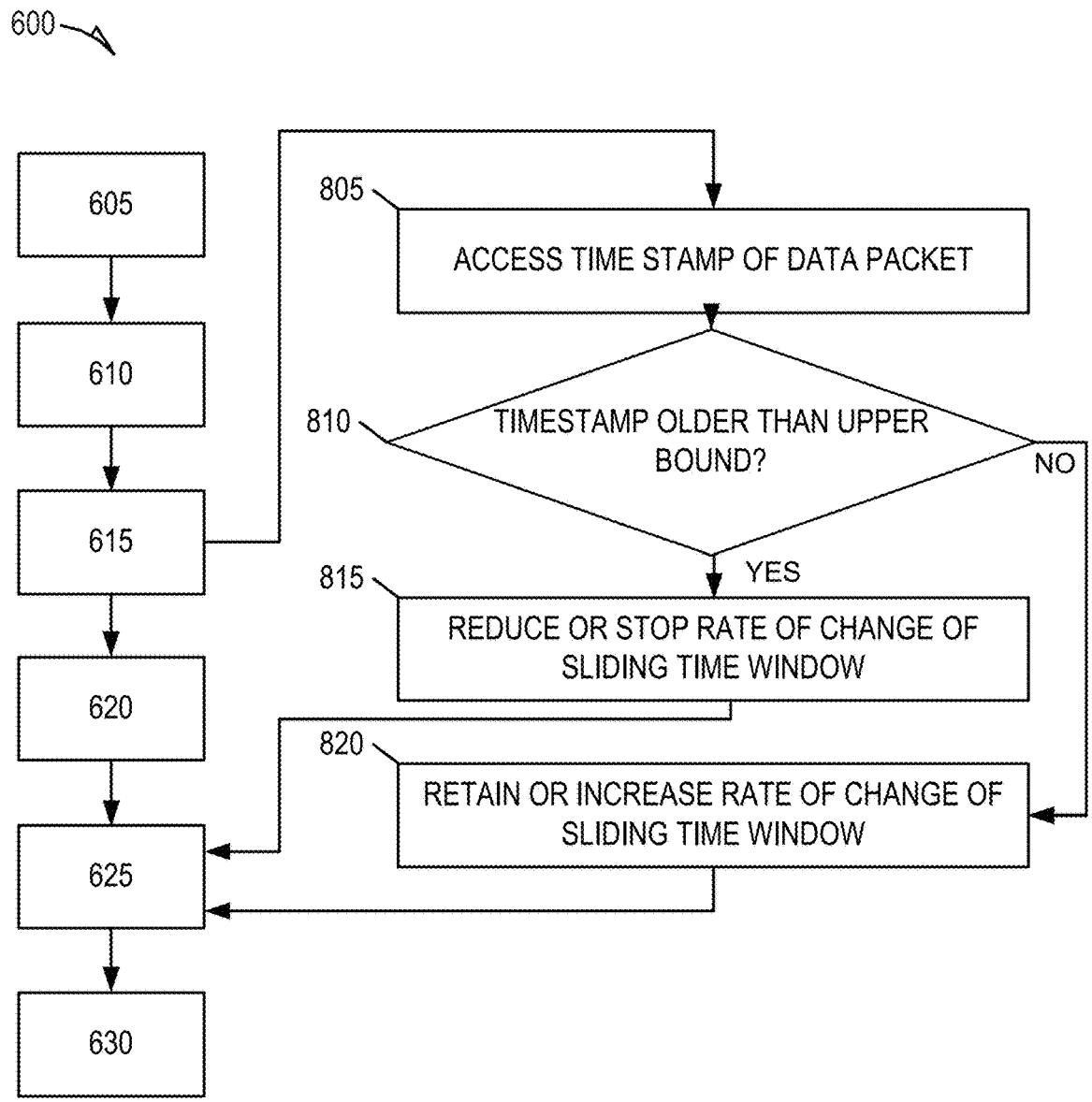

FIGS. 6-8 are flowcharts illustrating example operations of the visualization system 100 in performing a method 600 for rendering visual metaphors, according to example embodiments. The method 600 may be embodied in computer-readable instructions for execution by a hardware component (e.g., a processor) such that the operations of the method 600 may be performed by a computing machine. In particular, the operations of the method 600 may be performed in part or in whole by the functional components forming the visualization system 100; accordingly, the method 600 is described below, by way of example with reference thereto. However, it shall be appreciated that the method 600 may be deployed on various other hardware configurations and is not intended to be limited to the visualization system 100.

At operation 605, the back-end data processing component 102 obtains live streaming data from the data source 110. The live streaming data includes one or more data packets, and each data packet describes an event. Each data packet includes a timestamp 210 corresponding to the event and geospatial data identifying a source location and a destination location. The data source 110 may, for example, include or correspond to a server of a network-based commerce platform that hosts one or more commerce related applications. In this example, the events may correspond to transactions occurring on the network-based commerce platform where the source location corresponds to a seller location and the destination location corresponds to a buyer location.

Upon processing the live streaming data, the back-end data processing component 102 loads the live streaming data into CPU memory 206, at operation 610. For example, the live streaming data may be added to CPU cache of a server machine.

The dynamic memory management component 202 fetches at least a portion of the live streaming data from the CPU memory 206 (at operation 615) and loads the fetched live streaming data into local GPU memory 208 (at operation 620). The portion of the live streaming data fetched from the CPU memory 206 and loaded into the GPU memory 208 may be based on one or more constraints supplied by a user. In the example of the network-based commerce platform, the user may request that only transactions of a certain type or category be visualized. Before loading the fetched live streaming data into the GPU memory 208, the dynamic memory management component 202 may convert the data packets to a format that is suitable for processing by the GPU. As another example, the user may provide a time range as a constraint, and the data fetched by the dynamic memory management component 202 corresponds to data packets with timestamps within the user specified time range. In some embodiments, the dynamic memory management component 202 may fetch live streaming data in response to one or more data packets being purged from the GPU memory 208 (discussed further below).

At operation 625, the rendering engine 116 renders, on a display, one or more visual metaphors on a map using a visualization mathematical model. Each visual metaphor represents an event included in the live streaming data. The one or more visual metaphors may include at least one of a spatial adaptive arc animation, a scatterplot, or a geo-based bar chart. The visualization mathematical model defines, for each visual metaphor, varying spatial positions and opacities of the visual metaphor throughout a sliding time window (e.g., the sliding time window 212 illustrated in FIG. 2). For example, with reference to the spatial adaptive arc animation, as noted above, the visualization mathematical model controls the spatial position and opacity of every point along the arc throughout a sliding time window. In this example, the visualization mathematical model comprises: a first component that interpolates points on an arc between a source location and a destination location, a second component that applies a curvature control to the arc based on a distance between the source location and the destination location, a third component that introduces animation into the arc by varying opacity of the points on the arc over the sliding time window, and a fourth component that decreases opacity of the arc based on an age of the arc determined from a timestamp associated with the corresponding event (e.g., described by a data packet included in the live streaming data).

At operation 630, the dynamic memory management 202 purges one or more data packets from the GPU memory 208 and the CPU memory 206. As noted above, the visual mathematical model gradually decreases the opacity of visual metaphors until the visual metaphors become fully transparent to reduce visual clutter. The dynamic memory management component 202 may purge a data packet from the GPU memory 208 in response to a corresponding visual metaphor to make room in both the CPU and GPU memory 206, 208 for new data.

As shown in FIG. 7, the method 600 may, in some embodiments, further include operations 705, 710, 715, and 720. Consistent with some embodiments, the operations 705, 710, 715, and 720 may be performed as part of (e.g., sub-processes or sub-routines) of the operation 625 where the rendering engine 116 renders one or more visual metaphors. In particular, the operations 705, 710, 715, and 720 correspond to operations of generating a specific visual metaphor—the spatially adaptive arc—that represents an event described by a data packet included in live streaming data. Although only a single instance of the spatial adaptive arc is addressed in the description that follows, it shall be appreciated that operation 625 may involve rendering multiple spatially adaptive arcs.

At operation 705, the rendering engine 116 interpolates points of an arc on the map that connects the source location to the destination location. The rendering engine 116 interpolates the points of the arc based on the visual mathematical model as discussed above.

At operation 710, the rendering engine 116 applies curvature control to the arc based on a distance between the source location and the destination location. In applying curvature to the arc, the rendering engine 116 determines a maximum height for the arc based on the distance between the source location and the destination location in accordance with the visual mathematical model discussed above.

At operation 715, the rendering engine 116 animates movement of the arc from the source location to the destination location. The rendering engine 116 animates movement of the arc by varying opacity of portions of the arc throughout the sliding time window in accordance with the visual mathematical model discussed above. More specifically, the rendering engine 116 animates movement of the arc by increasing opacity of a particular section of the arc (a "highlight" section), which is initially positioned at the source location, and gradually moving the highlight section from the source location to the destination location while maintaining the opacity of the other sections of the arc.

At operation 720, the rendering engine 116 gradually decreases an overall opacity of the arc. The rendering engine 116 gradually decreases the overall opacity of the arc throughout the sliding time window until the arc becomes fully transparent (e.g., at the end of the sliding time window).

As shown in FIG. 8, the method 600 may, in some embodiments, further include operations 805, 810, 815, and 820. As shown, the operations 805, 810, 815, and 820 may be performed subsequent to operation 615 where the dynamic memory management component 202 fetches at least a portion of the live streaming data from the CPU memory 206 and in parallel with operation 620 where the dynamic memory management component 202 loads the fetched data into local GPU memory 208. Further, as will be appreciated from the description that follows, the operations 805, 810, 815, and 820 correspond to a method for adaptive jitter control performed by the adaptive jitter stabilization component 204.

At operation 805, the adaptive jitter stabilization component 204 accesses a timestamp 210 of a data packet included in the live streaming data fetched from the CPU memory 206. The timestamp 210 may be provided to the adaptive jitter stabilization component 204 by the dynamic memory management component 202.

As noted above, the sliding time window 212 includes a lower bound and an upper bound. At operation 810, the adaptive jitter stabilization component 204 compares the timestamp 210 with the upper bound of the sliding time window 212 to determine whether the timestamp 210 is older than the upper bound of the sliding time window 212. In other words, the adaptive jitter stabilization component 204 determines whether the timestamp 210 is earlier in time than the upper bound of the sliding time window 212. If the adaptive jitter stabilization component 204 determines the timestamp 210 is older than the upper bound of the sliding time window 212, the adaptive jitter stabilization component 204 reduces or stops the rate of change of the sliding time window 212 at operation 815. If the adaptive jitter stabilization component 204 determines the upper bound is older than the timestamp 210, the adaptive jitter stabilization component 204 retains or increases the rate of change of the sliding time window 210 at operation 820.

Figure 9:
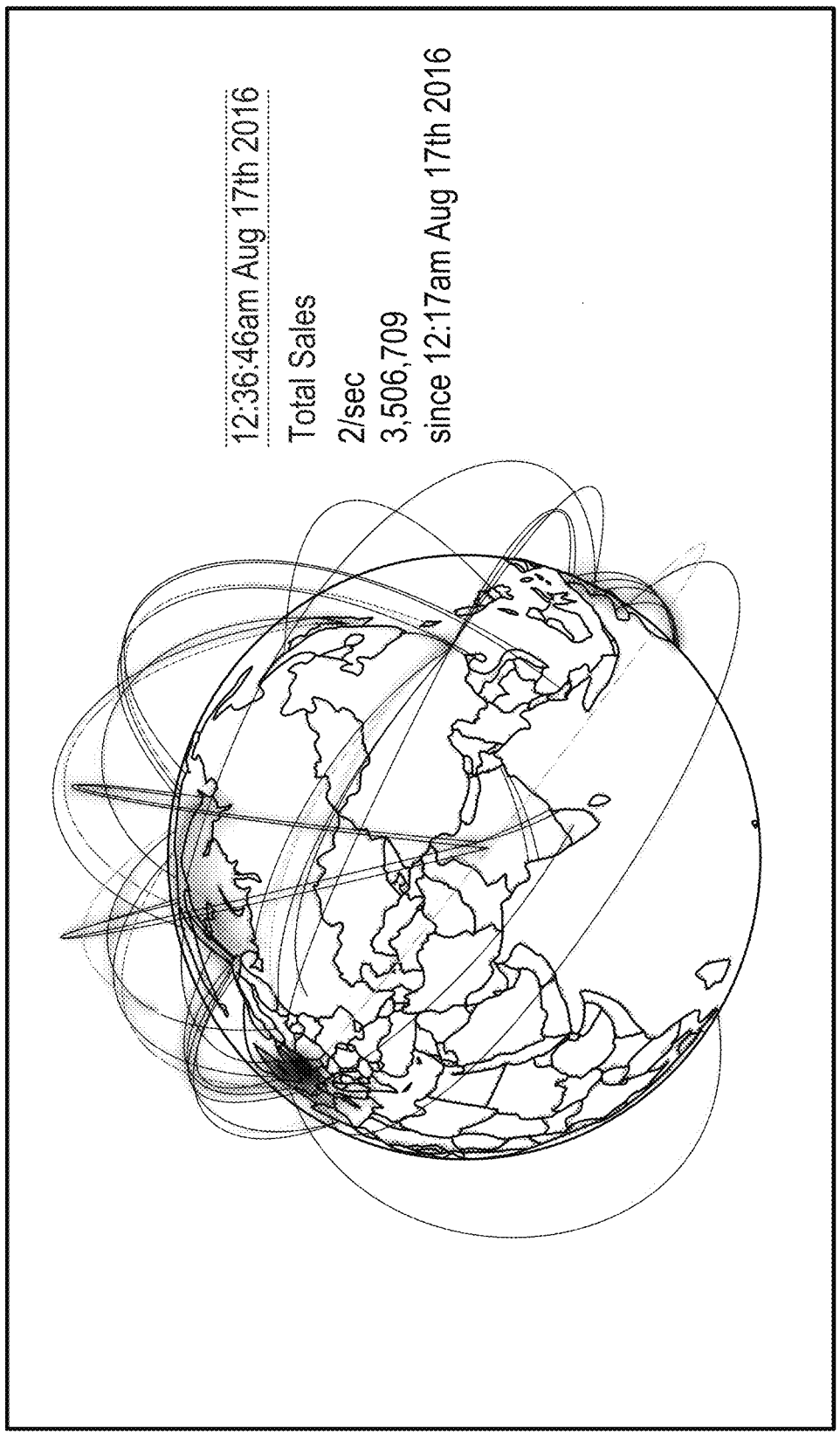
FIGS. 9-15 illustrate aspects of user interfaces provided by the visualization system, according to example embodiments.
Figure 10:
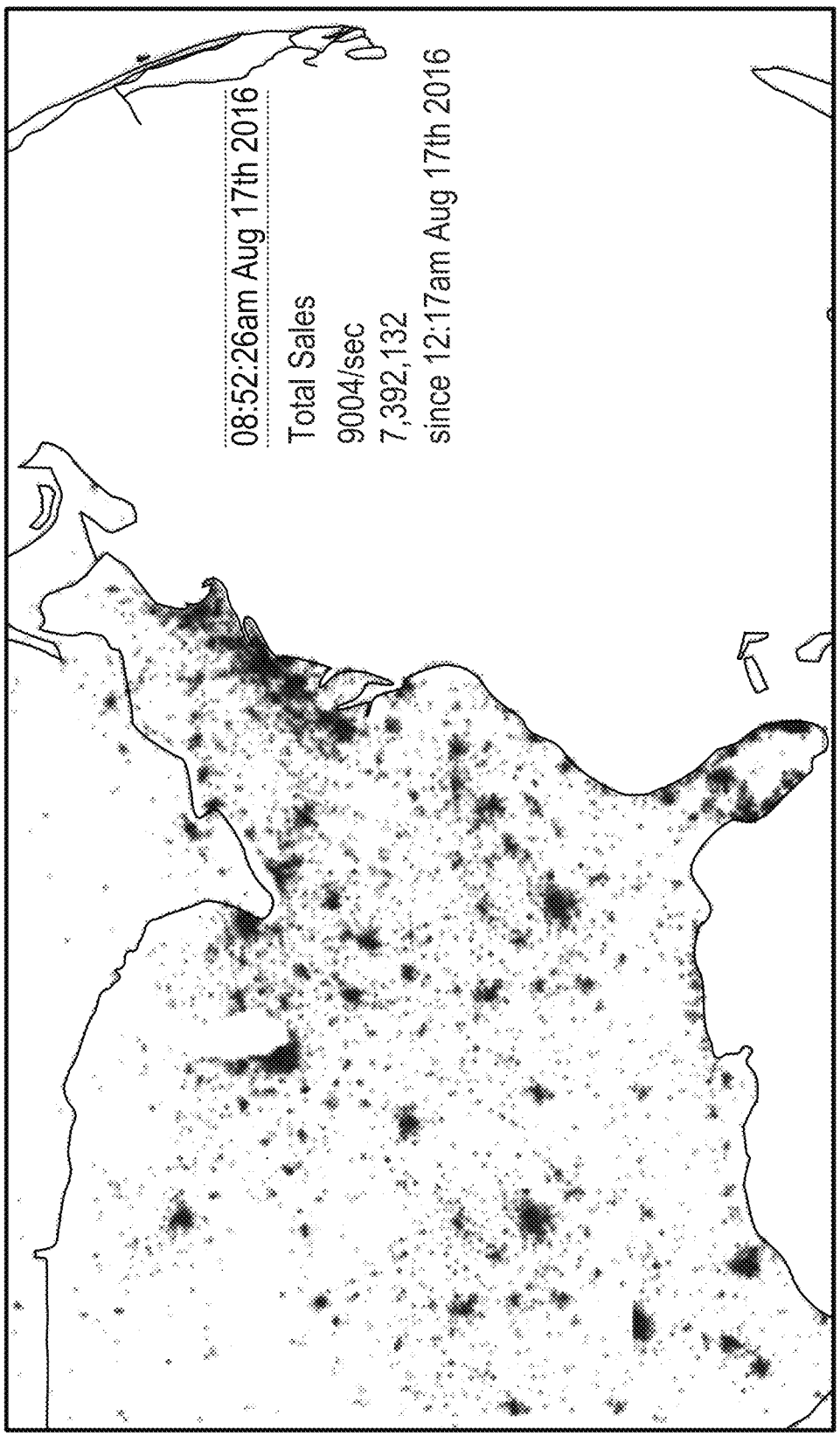
Figure 11:
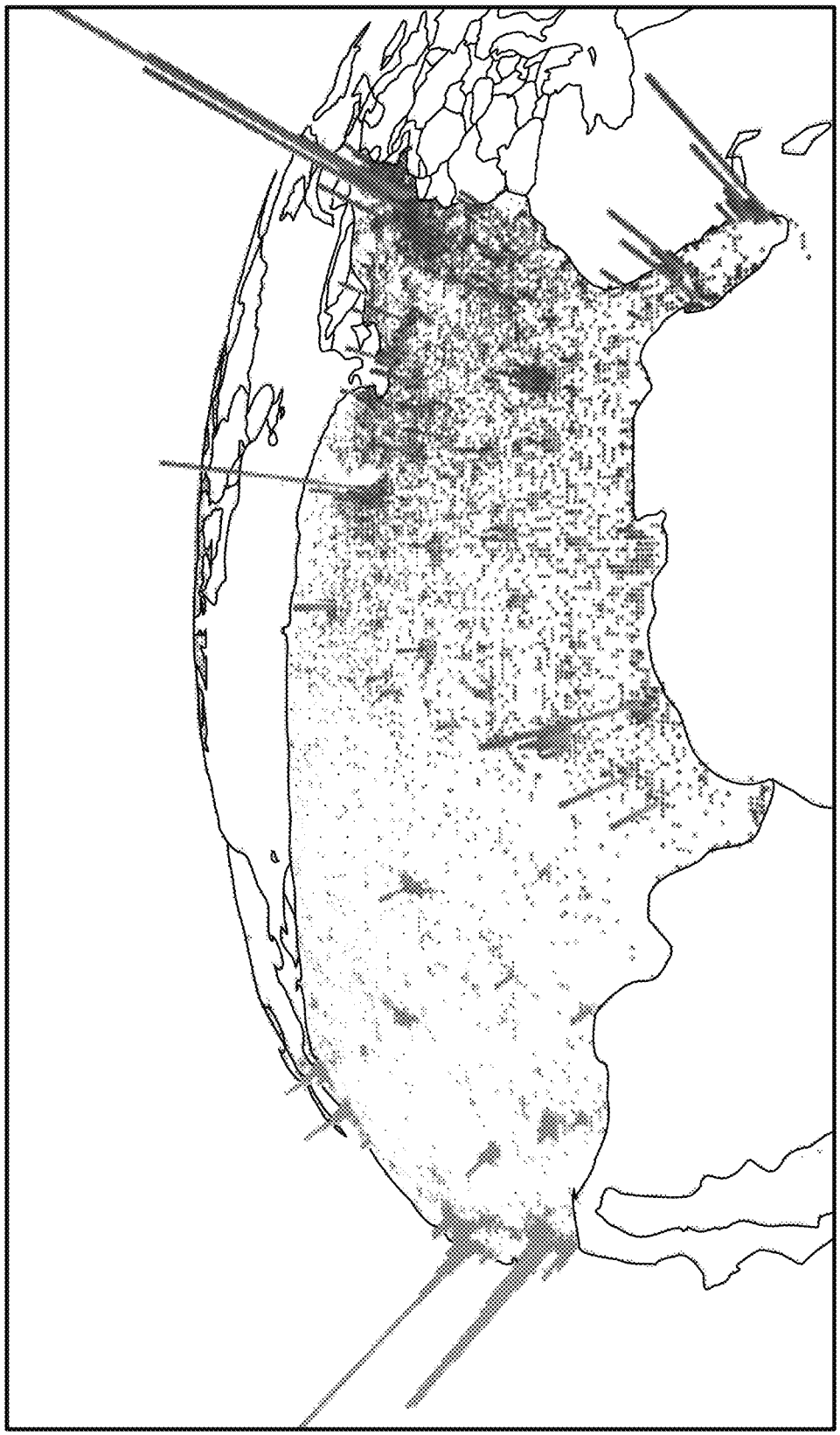
Figure 12:
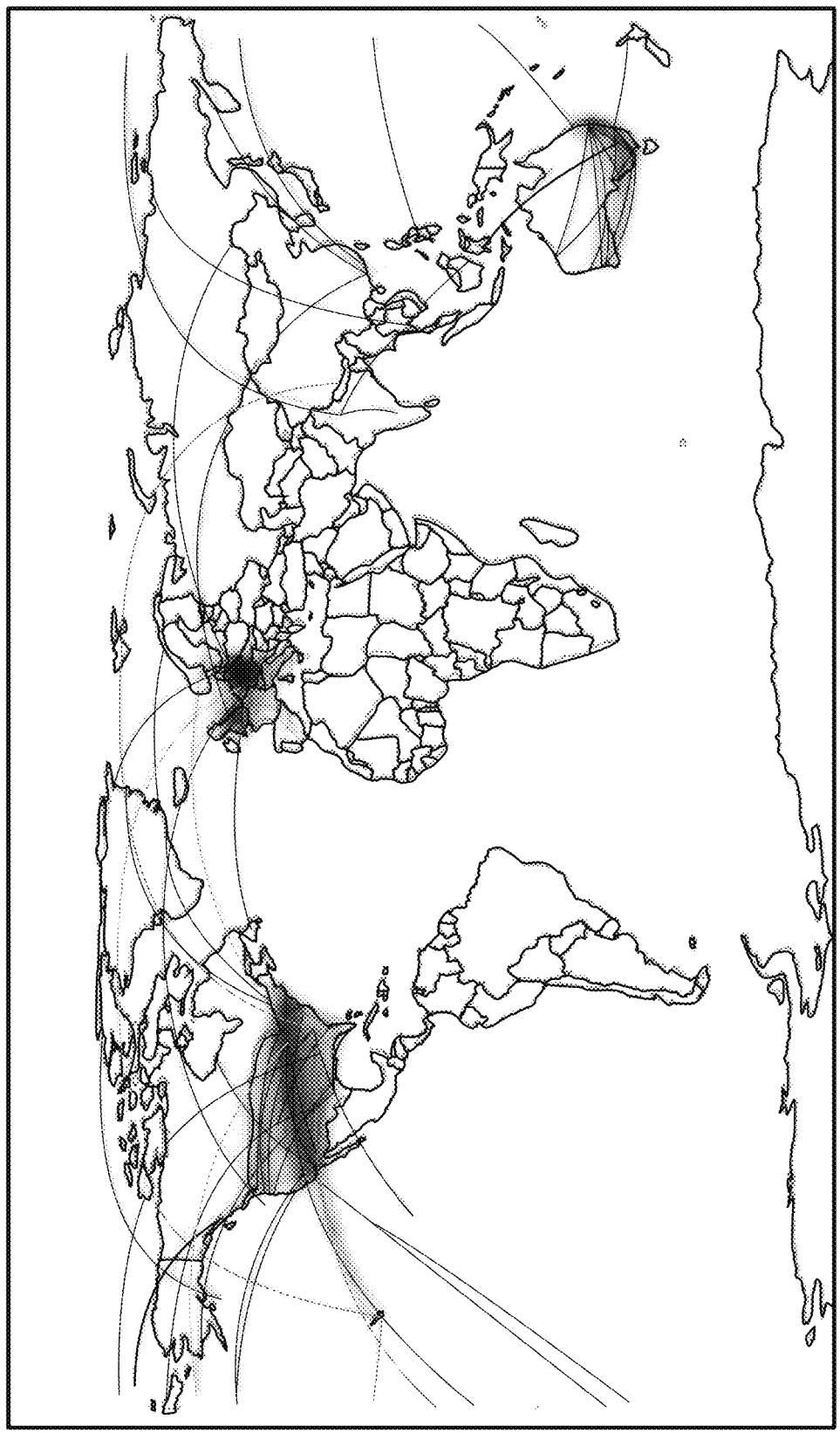

FIGS. 9-15 illustrate aspects of user interfaces in accordance with various embodiments. FIG. 9 illustrates multiple spatial adaptive arcs flying around a 3D virtual globe with each representing a unique transaction between a source location and a destination location in real-time. FIG. 10 illustrates a scatter plot rendered on a 3D virtual globe using the density of real-time events. FIG. 11 illustrates a bar chart rendered on a 3D virtual globe using the accumulated count of historical events. FIG. 12 illustrates spatial adaptive arcs projected onto a 2D planar world map.

Figure 13:
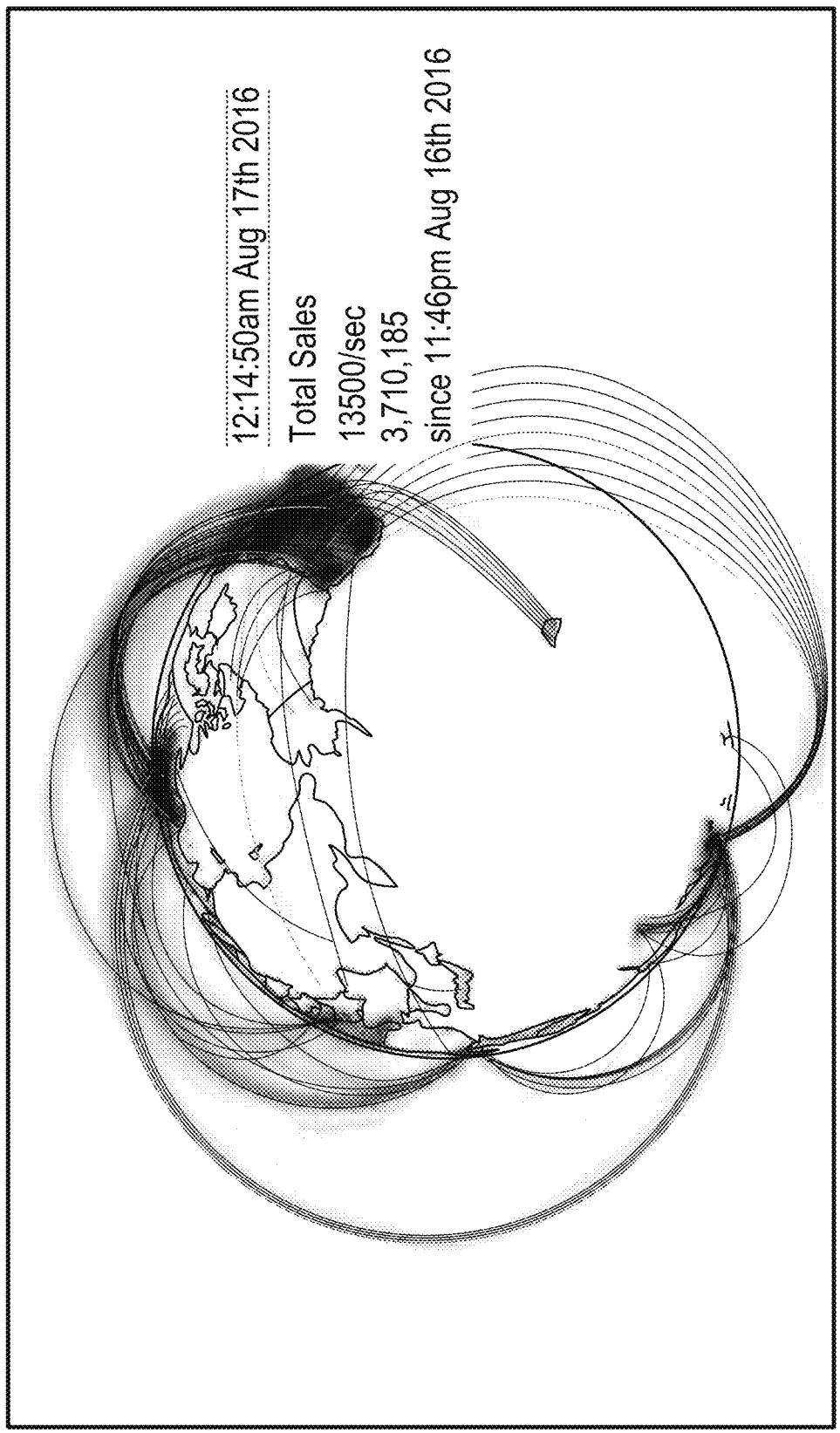

FIG. 13 illustrates a rendered set of arcs occurring when the decay rate is low in Formula 5. As shown, the spatial adaptive control of Formula 3 makes the arcs naturally clustered by the distance between their end points, forming a set of salient visual patterns.

Figure 14:
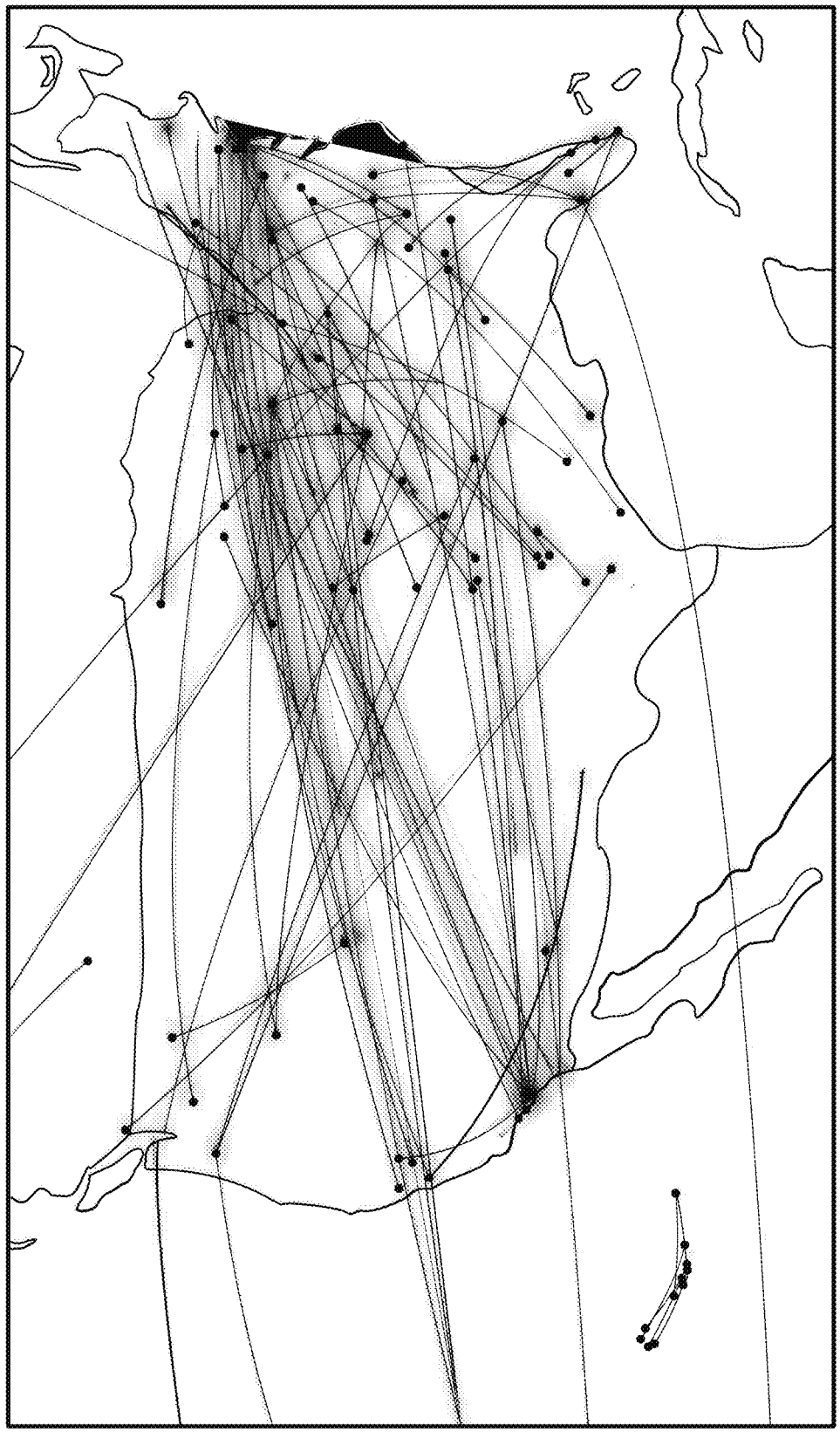

FIG. 14 illustrates a moment of real-time transaction event in the United States. Highlights on the arcs give the flying direction from a source location (e.g., a seller location) to a destination location (e.g., buyer location).

FIG. 15 illustrates a result of employing Force-Directed Edge Bundling to bundle multiple arcs together based on their spatial proximity and similarity of user defined properties.

Figure 16:
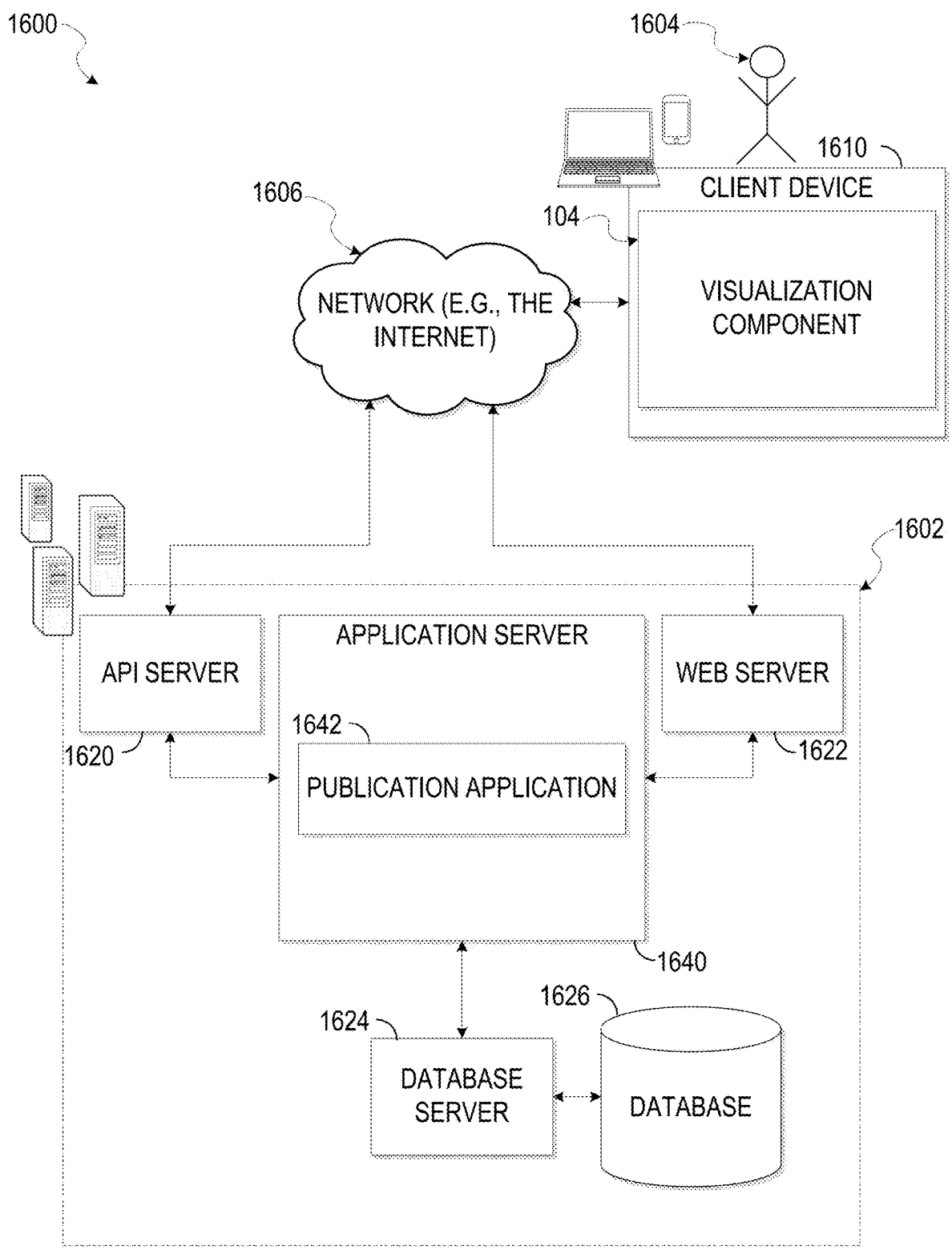
FIG. 16 is a network diagram illustrating a network environment in which the visualization system may be deployed, according to example embodiments.

With reference to FIG. 16, an example embodiment of a client-server-based architecture 1600 is shown. More specifically, FIG. 16 illustrates an example of a network system in which the visualization system 100 may be deployed. To avoid obscuring the inventive subject matter with unnecessary detail, various functional components that are not germane to conveying an understanding of the inventive subject matter have been omitted from FIG. 16. Moreover, it shall be appreciated that although the various functional components illustrated in FIG. 16 are discussed in a singular sense, multiple instances of any one of the various functional components may be employed.

As shown in FIG. 16, a client device 1610 may be in communication with a content publication platform 1602 over a network 1606. Consistent with some embodiments, the device 1610 includes the visualization component 104 of the visualization system 100. In some embodiments, the content publication platform 1602 corresponds to the data source 110.

One or more portions of the network 1606 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The content publication platform 1602 provides server side functionality via the network 1606 to the client device 1610. The client device 1610 may comprise, but is not limited to, a mobile phone, desktop computer, a virtual reality headset or other virtual reality enabled device, a laptop, a portable digital assistant (PDA), a smart phones, a tablet, an ultra book, a netbook, a laptop, a multi-processor system, a microprocessor-based or programmable consumer electronic device, a game console, a set-top box, or any other communication device that a user may utilize to access the content publication platform 1602 or visualization system 100. In one embodiment, the content publication platform 1602 is a network-based marketplace that publishes publications (e.g., web documents) comprising item listings of products available on the network-based marketplace. Such a network-based marketplace may host listings for products of a particular category or products from many categories.

The client device 1610 may further include one or more applications (also referred to as "apps") such as, but not limited to, a web browser, a virtual reality application, messaging application, electronic mail (email) application, an e-commerce application (also referred to as a marketplace application), and the like. In some embodiments, the client device may include one or more applications configured to locally provide user interfaces and at least some of the functionalities to communicate with the content publication platform 1602, on an as needed basis, for data or processing capabilities not locally available (e.g., access to a database of items available for sale, to authenticate the user 1604, to verify a method of payment, etc.).

The user 1604 may be a person, a machine, or other means of interacting with the client device 1610. In example embodiments, the user 1604 is not part of the client-server-based architecture 1600, but may interact with the visualization system 100 and the content publication platform 1602 via the client device 1610.

An application program interface (API) server 1620 and a web server 1622 are coupled to, and provide programmatic and web interfaces respectively to an application server 1640. The application server 1640 may host a publication application 1642, which may be embodied as hardware, software, firmware, or any combination thereof. The application server 1640 is, in turn, shown to be coupled to a database server 1624 that facilitates access to database 1626. In an example embodiment, the database 1626 is a storage devices that stores information to be posted (e.g., publications or listings) to the publication application 1642. The database 1626 may also store digital item information in accordance with example embodiments.

The publication application 1642 provides a number of publication functions and services to users that access the content publication platform 1602. For example, the publication application 1642 provides interfaces (e.g., through communication with the client device 1610) that allow the user 1604 to create and publish web documents (e.g., product listings) using the client device 1610. The publication application 1642 may further provide interfaces that allow the user 1604 to modify various parts of the published web document.

While the content publication platform 1602 and the visualization component of the visualization system 100 are shown in FIG. 16 to be separate and distinct, it will be appreciated that, in alternative embodiments, the visualization system 100 may be incorporated in and form part of the content publication platform 1602 (e.g., the visualization system 100 is a sub-system of the content publication platform 1602).

Software Architecture

Figure 17:
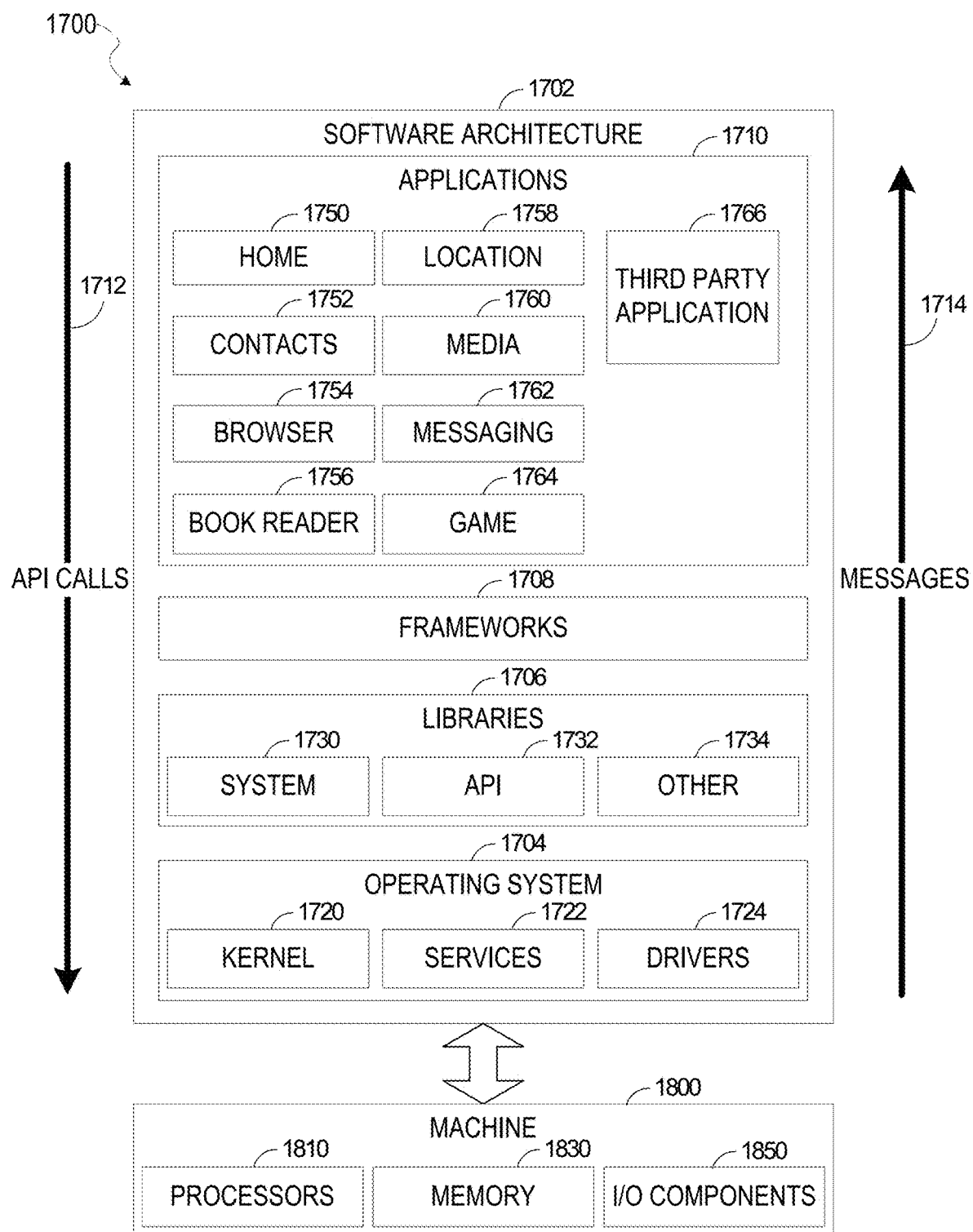
FIG. 17 is a block diagram illustrating a representative software architecture, which may be used in conjunction with various hardware architectures herein.

FIG. 17 is a block diagram 1700 illustrating an architecture of software 1702, which can be installed on any one or more of the devices described above. FIG. 17 is merely a non-limiting example of a software architecture, and it will be appreciated that many other architectures can be implemented to facilitate the functionality described herein. In various embodiments, the software 1702 is implemented by hardware such as a machine 1800 of FIG. 18 that includes processors 1810, memory 1830, and I/O components 1850. In this example architecture, the software 1702 can be conceptualized as a stack of layers where each layer may provide a particular functionality. For example, the software 1702 includes layers such as an operating system 1704, libraries 1706, frameworks 1708, and applications 1710. Operationally, the applications 1710 invoke application programming interface (API) calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphic user interface (GUI) functions, high-level resource management, high-level location services, and so forth. The frameworks 1708 can provide a broad spectrum of other APIs that can be utilized by the applications 1710, some of which may be specific to a particular operating system or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third-party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third-party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1766 can invoke the API calls 1712 provided by the operating system 1704 to facilitate functionality described herein.

Machine Architecture

Figure 18:
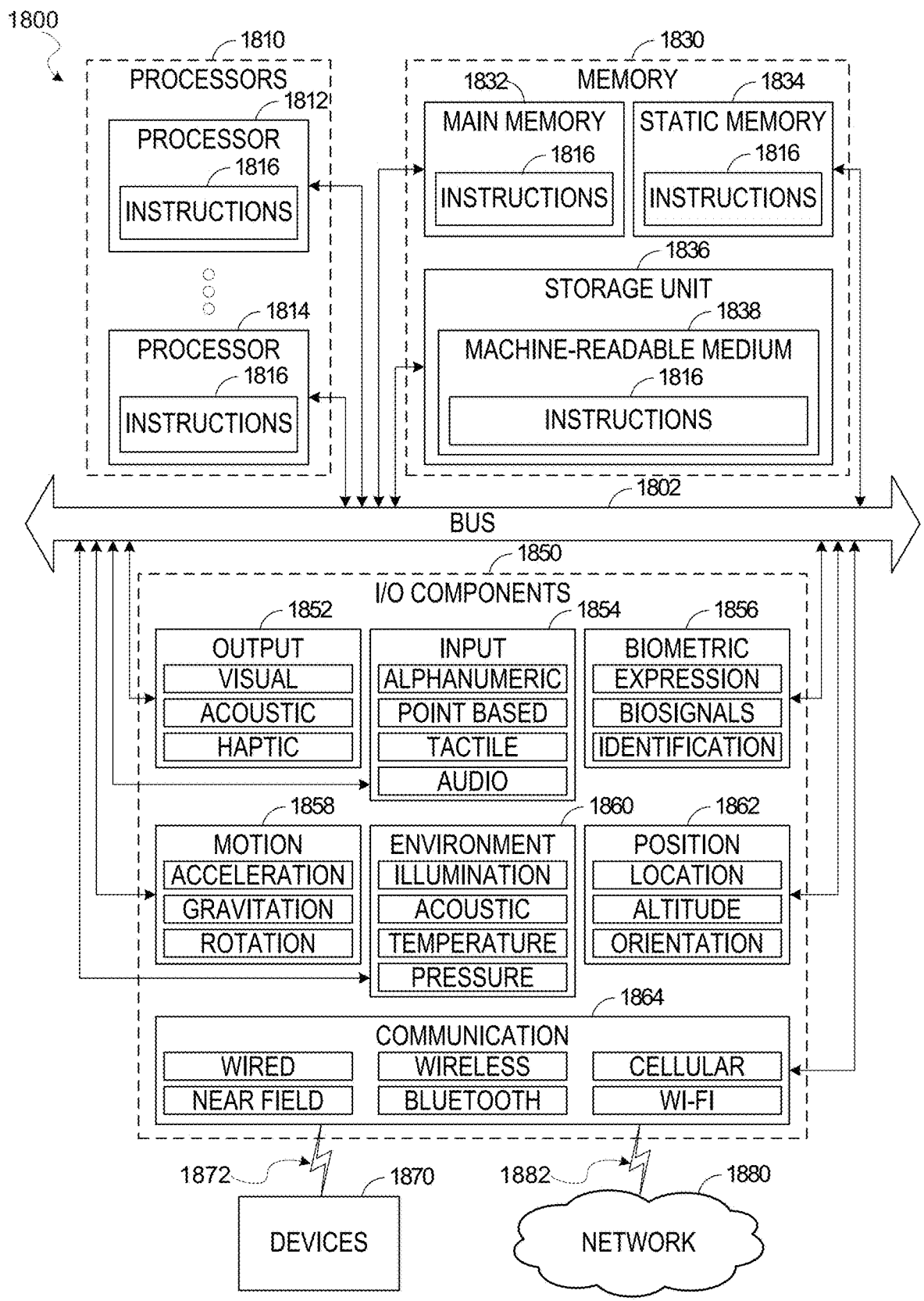
FIG. 18 is a block diagram illustrating components of a machine, according to some example embodiments, able to read instructions from a machine-readable medium and perform any of the methodologies discussed herein.

FIG. 18 illustrates a diagrammatic representation of a machine 1800 in the form of a computer system within which a set of instructions may be executed for causing the machine 1800 to perform any one or more of the methodologies discussed herein, according to an example embodiment. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. For example, the instructions 1816 may cause the machine 1800 to execute the method 600 of FIGS. 6-8. Additionally, or alternatively, the instructions 1816 may implement at least a portion of the components illustrated in FIGS. 1 and 2 so forth. The instructions 1816 transform the general, non-programmed machine 1800 into a particular machine 1800 programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory 1830, and I/O components 1850, which may be configured to communicate with each other such as via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1812 and a processor 1814 that may execute the instructions 1816. The term "processor" is intended to include multi-core processors that may comprise two or more independent processors (sometimes referred to as "cores") that may execute instructions contemporaneously. Although FIG. 18 shows multiple processors 1810, the machine 1800 may include a single processor with a single core, a single processor with multiple cores (e.g., a multi-core processor), multiple processors with a single core, multiple processors with multiples cores, or any combination thereof.

The memory 1830 may include a main memory 1832, a static memory 1834, and a storage unit 1836, both accessible to the processors 1810 such as via the bus 1802. The main memory 1830, the static memory 1834, and storage unit 1836 store the instructions 1816 embodying any one or more of the methodologies or functions described herein. The instructions 1816 may also reside, completely or partially, within the main memory 1832, within the static memory 1834, within the storage unit 1836, within at least one of the processors 1810 (e.g., within the processor's cache memory), or any suitable combination thereof, during execution thereof by the machine 1800.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862, among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or another suitable device to interface with the network 1880. In further examples, the communication components 1864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a USB).

Moreover, the communication components 1864 may detect identifiers or include components operable to detect identifiers. For example, the communication components 1864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as location via Internet Protocol (IP) geolocation, location via Wi-Fi® signal triangulation, location via detecting an NFC beacon signal that may indicate a particular location, and so forth.
Executable Instructions and Machine Storage Medium The various memories (i.e., 1830, 1832, 1834, and/or memory of the processor(s) 1810) and/or storage unit 1836 may store one or more sets of instructions and data structures (e.g., software) embodying or utilized by any one or more of the methodologies or functions described herein. These instructions (e.g., the instructions 1816), when executed by processor(s) 1810, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., hypertext transfer protocol (HTTP)). Similarly, the instructions 1816 may be transmitted or received using a transmission medium via the coupling 1872 (e.g., a peer-to-peer coupling) to the devices 1870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1816 for execution by the machine 1800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method implemented by a computing device, the method comprising:
    loading, in memory, streaming data describing in real-time an event corresponding to a transaction, wherein a real-time description of the event by the streaming data includes a source location and a destination location of the transaction; and
    rendering, on a display, a visual metaphor representing the event, wherein:
        the visual metaphor has end points positioned at the transaction's source and destination locations;
        the visual metaphor connects the end points positioned at the transaction's source and destination locations; and
        points along the visual metaphor are each associated with a spatial position and an opacity defined throughout a sliding time window by a visualization mathematical model.

2. The method as described in claim 1, wherein the visual metaphor is a spatially adaptive arc connecting the end points positioned at the transaction's source and destination locations.

3. The method as described in claim 2, wherein a height of the spatially adaptive arc is based, in part, on a distance between the source and destination locations.

4. The method as described in claim 3, wherein the distance corresponds to a distance on a map between the source and destination locations.

5. The method as described in claim 4, wherein the map is a virtual 3D globe.

6. The method as described in claim 1, further comprising:
    loading, in the memory, additional streaming data describing in real-time a plurality of additional events corresponding to additional transactions, wherein real-time descriptions of the plurality of additional events by the additional streaming data include source locations and destination locations of the additional transactions; and
    rendering, on the display, additional visual metaphors representing the plurality of additional events.

7. The method as described in claim 6, wherein the visual metaphor representing the event and the additional visual metaphors representing the plurality of additional events are rendered on a two-dimensional planar map that is rendered on the display.

8. The method as described in claim 6, wherein the visual metaphor and the additional visual metaphors are spatially adaptive arcs between the source and destination locations.

9. The method as described in claim 8, further comprising clustering at least a subset of the spatially adaptive arcs between the source and destination locations.

10. The method as described in claim 1, further comprising animating the visual metaphor based on the streaming data by changing opacity of at least one portion of the visual metaphor between the end points positioned at the source location and the destination location such that the opacity of the at least one portion is different at a first time in the sliding time window from the opacity of the at least one portion at a second time in the sliding time window.

11. The method as described in claim 1, wherein:
    the streaming data further describes in real-time a plurality of additional events, including describing, for each event of the plurality of additional events, a respective source location and a respective destination location; and
    the visual metaphor representing the event is rendered in connection with rendering visual metaphors representing the plurality of additional events.

12. The method as described in claim 1, further comprising defining, for each of the points along the visual metaphor and throughout the sliding time window, the spatial position and the opacity by using the visualization mathematical model.

13. The method as described in claim 1, wherein rendering the visual metaphor on the display is based on an amount of jitter of the streaming data, the amount of jitter determined based on a most recent timestamp of the event.

14. A system comprising:
    one or more processors of a machine; and
    a machine-readable medium storing instructions that, when executed by the one or more processors, cause the machine to perform operations comprising:

loading, in memory, streaming data describing in real-time an event corresponding to a transaction, wherein a real-time description of the event by the streaming data includes a source location and a destination location of the transaction; and rendering, on a display, a visual metaphor representing the event, wherein:

the visual metaphor has end points positioned at the transaction's source and destination locations;

the visual metaphor connects the end points positioned at the transaction's source and destination locations; and points along the visual metaphor are each associated with a spatial position and an opacity defined throughout a sliding time window by a visualization mathematical model.

15. The system as described in claim 14, wherein the operations further comprise:

loading additional streaming data describing in real-time a plurality of additional events corresponding to additional transactions, wherein real-time descriptions of the plurality of additional events include source locations and destination locations of the additional transactions; and rendering, on the display, additional visual metaphors representing the plurality of additional events.

16. The system as described in claim 15, wherein the visual metaphor representing the event and the additional visual metaphors representing the plurality of additional events are rendered on a two-dimensional planar map that is rendered on the display.

17. The system as described in claim 14, wherein the visual metaphor is a spatially adaptive arc and a height of the spatially adaptive arc is based, in part, on a distance between the source and destination locations.

18. A non-transitory machine-storage medium embodying instructions that, when executed by at least one processor of a machine, cause the machine to perform operations comprising:

loading streaming data describing in real-time an event corresponding to a transaction, wherein a real-time description of the event by the streaming data includes a source location and a destination location of the transaction; and rendering, on a display, a visual metaphor representing the event, wherein:

the visual metaphor has end points positioned at the transaction's source and destination locations;

the visual metaphor connects the end points positioned at the transaction's source and destination locations; and points along the visual metaphor are each associated with a spatial position and an opacity defined throughout a sliding time window by a visualization mathematical model.

19. The non-transitory machine-storage medium of claim 18, wherein the visual metaphor is a spatially adaptive arc connecting the end points positioned at the transaction's source location and the destination location.

20. The non-transitory machine-storage medium of claim 19, wherein a height of the spatially adaptive arc is based, in part, on a distance between the source and destination locations.

* * * * *